(12) United States Patent
Mullins

(10) Patent No.: US 7,103,600 B2
(45) Date of Patent: *Sep. 5, 2006

(54) DISPLAYABLE PRESENTATION PAGE AND SQL SEARCHABLE RELATIONAL DATA SOURCE IMPLEMENTATION OF A SYSTEM, METHOD AND SOFTWARE FOR CREATING OR MAINTAINING DISTRIBUTED TRANSPARENT PERSISTENCE OF COMPLEX DATA OBJECTS AND THEIR DATA RELATIONSHIPS

(75) Inventor: Ward Mullins, San Francisco, CA (US)

(73) Assignee: Thought Inc., San Francisco, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 10/382,302

(22) Filed: Mar. 6, 2003

(65) Prior Publication Data
US 2004/0177093 A1 Sep. 9, 2004

(51) Int. Cl.
*G06F 17/30* (2006.01)

(52) U.S. Cl. ..................... 707/10; 707/104.1

(58) Field of Classification Search ............ 707/1, 707/3, 10, 102, 103 R, 103 Y, 104.1; 705/1, 705/8; 709/219, 246; 713/200; 715/513
See application file for complete search history.

(56) References Cited

U.S. PATENT DOCUMENTS 6,633,889 B1 * 10/2003 Dessloch et al. ....... 707/103 Y

* cited by examiner

*Primary Examiner*—Apu M. Mofiz
(74) *Attorney, Agent, or Firm*—Robert Lev

(57) ABSTRACT

The invention provides systems, methods and software for creating or maintaining distributed transparent persistence of complex data objects and associated data stores. In one aspect, the invention also relates to an application programming object capable of creating or maintaining distributed transparent persistence of data objects or data object graphs without the necessity of inserting any byte codes or modification of the object graph. Virtually any java object or object praph can be transparently persisted. Further, copies of a data graph or of a portion of the data graph can be automatically reconciled and changes persisted without any persistence coding in the object model.

17 Claims, 3 Drawing Sheets

DISPLAYABLE PRESENTATION PAGE AND SQL SEARCHABLE RELATIONAL DATA SOURCE IMPLEMENTATION OF A SYSTEM, METHOD AND SOFTWARE FOR CREATING OR MAINTAINING DISTRIBUTED TRANSPARENT PERSISTENCE OF COMPLEX DATA OBJECTS AND THEIR DATA RELATIONSHIPS

FIELD OF THE INVENTION

The field of the present invention relates generally to computer systems, computer data stores and to methods and software for accessing and utilizing data stores. More particularly, the present invention relates to a system, methods and software for creating or maintaining distributed transparent persistence of complex data objects and associated data stores. In one aspect, the invention also relates to an application programming object capable of creating or maintaining distributed transparent persistence of data objects or data object graphs without the necessity of inserting any byte codes or modification of the object graph. Virtually any java object or object graph can be transparently persisted. Further, copies of a data graph or of a portion of the data graph can be automatically reconciled and changes persisted without any persistence coding in the object model.

BACKGROUND OF THE INVENTION

Systems for accessing data stores from object oriented languages have been used for many years. A frequent approach to accomplish access of data stores involves writing and embedding custom access code within an object application needing the access. This approach is generally limited to having the custom code access only a single relational table within a relational database or similar construct within any other data store (hereinafter collectively "data store"). Under the circumstances where a developer has control over the design and creation of a data store from its inception, it is possible to design and store meaningful information in a single table. Such design opportunities are usually rare, however.

Generally, the methods for producing persistence for a data object, complex data object or a data store conflict with the goals of producing pure object application models where the object models do not include persistence objects or persistence byte code. Particular difficulties exist in a distributed environment since an object application model may exist in one or more of a computer's memory, an application data store and an application information storage repository that may be independent of the data store organization or object definitions. Advancements in the art have been made with respect to tools for conveniently mapping objects to systems of tables and maps in order to expedite accessing, changing and updating data stores. See, for example, U.S. Pat. No. 5,857,197 (and its associated programming interfaces ("APIs")) describes tools for translating object data to relational data, relational data to object data, and object data to object data to expedite the use of data stores. The BMP and the CMP Installer portions of CocoAdmin tool in the CocoBase™ Enterprise for O/R Binary Software (Thought, Inc. 657 Mission Street Suite 202, San Francisco, Calif. 94105 http://www.thoughtinc.com,) provide means for providing persistence in the EJB environment.

Persistence problems arise with the creation, access, changing or deleting of an object application model that utilizes such data stores. The object application model may be distributed over multiple physical computer machine locations or even distributed over multiple Internet website locations that may be independent of the data stores. The object application model may utilize a different set of data objects or different set of definitions for relationships between data objects than that of one or more of its data sources. In most situations, the respective structures of the data sources and of the object applications model simply do not conveniently allow for mapping, accessing or changing of an overall schema of application data objects as well as any associated definitions of relationships between two or more data objects or elements within a data object.

Importantly, relationships may exist between a data object and one or more of the other data objects found in the object application model or in a data object of the data source. A relationship between one data object and another data object or with a data source may be member selected from the group of three relationship types consisting of 1 to 1 (1—1), 1 to many (1-M) or many to many (M—M). Complex combinations of these relationships may exist as a data object relationships definition for a given data object. These relationships are described or illustrated in further detail later in this document.

Objects may logically span multiple relational tables or multiple object databases, and may even be distributed over a logical (or hypothetical) computer system involving multiple physically independent computer systems or even multiple website locations. Creating, accessing, maintaining or updating an object application model can require working with multiple translation modules and require tedious and repetitive updating of multiple individual computer systems or multiple data sources in order to do useful work and keep the object application model synchronized. Such approaches are both costly and unwieldy in terms of computing and development resources, particularly with respect to Internet based electronic commerce (eCommerce) object application models.

Data objects of an object application model are often a feature of eCommerce object programming applications, where information is obtained from a data source and the data is defined as a data object (e.g., as a Java class) for use with another computer application. In practice, a data object or model of data objects may exist only in the random access memory of a computer memory system, or may be saved to either a data source or to some other type of retrievable information repository. A programmer or administrator of an object data application cannot easily access or track the overall model or diagram of data objects for an object application model or some of its specific elements. Unfortunately, tools for accessing and persisting data objects and associated data object relationships of a complex data object graph model have not been well implemented in the field of object language programming.

A computer application can execute one or more of the following non-limiting actions with respect to one or more of the members selected from the group consisting of data, a data object, and a data object definition: access data, change data, create data, create a new relationship between one or more data objects by creating or changing at least one data object relationship definition, change or delete a relationship between one or more data objects by changing or deleting at least one data object relationship definition, access a data object relationship definition and use its parameters to access a data source or a data object, and access one or more data object relationship definitions or data objects to create a new data object or data object relationship. Any changes executed by a computer application with respect to one or more of the members selected from the group consisting of data, data object or data object definition may need to be properly persisted (permanently stored) to preserve any changes to one or more of the members selected from the group consisting of data, a data object and a data object definition.

A data object and an associated data object relationship definition may be represented by a complex data object graph ("CDOG"). A CDOG, for the purposes of this document, may be thought of as a computer program data object graph that represents a data object having at least one relationship with at least one other data object or with itself via a circular link. When the data object of a CDOG is implemented in the Java computer program language, the CDOG may be further defined as being a Java Data Object Graph ("JDOG").

There are needs for software, methods and systems that can easily detect and persist any changes to at least one member selected from the group consisting of a data object, any data associated with the related object, or any associated CDOG definition (i.e., an changes to the data object, data or to a relationship of the data object with another data object). For example, there is a need to be able access a pure object model definition from a repository based O/R mapping tool (e.g., from a defined repository such as a file, database or streaming source) or from a modeling tool defined repository and provide persistence for the object model without inserting any byte code or additional objects into the object model.

Accordingly, there is a strong need in the art for a computer applications programmer tool designed to assist a programmer or administrator in the actions of providing persistence for data objects or data object graphs when deleting, inactivating or updating a CDOG, wherein the computer applications programmer tool can be configured to automatically reconcile all or a portion of a CDOG and copies thereof on a distributed environment when data objects or relationships are deleted, inactivated or updated for a CDOG. A particularly strong need exists for such a tool having the further ability to be configured to persist, propagate and reflect system wide (in a local or distributed computer system) any such changes to a CDOG instance to all instances of the CDOG and to all instances of associated data, data objects and data object relationships.

DEFINITIONS

The following non-exhaustive list of definitions is used herein to define terms that may otherwise be confusing or can sometimes have multiple meanings. Each occurrence of a defined term in the above text, in the text that follows, or in the claims of this document, is to be given the meaning ascribed to it in the list of definitions below.

"Instance" as referred to in this document in the context of computer software applications is a single occurrence of a software logical element in the memory of a computer system, such as a "class", an "object", a "data object", and the like. This is analogous to the occurrence of a logical memory unit representing a row of data in common practice.

"Class" as referred to in this document in the context of computer software applications is a logic unit in a computer application or a computer software program where the application or program is based upon an objected oriented programming language (e.g., Java). In practice, a class is a logical unit used as a logical template in an object oriented language from which to allocate new instances of objects.

"Object" as used in the context of this document is a general term referring to a logic unit in a computer application or a computer software program where the application or program is based upon an objected oriented programming language (e.g., Java). The term "object" may ordinarily be used interchangeably with the term "class" as a template or as an instance depending on the context.

"Data object" as referred to in the context of this document represents the concept of the occurrence of an object that holds data within a specific computer application domain and is likely to have its contents stored in a persistent data source of a computer system (e.g., a database server, a binary file, a text file, or even in a combination of two or more of such a persistent data sources of a computer system). A data object may exist as an independent data object without any relationship to any other data object or it may have one or more relationships with itself or with one or more other data objects.

"Complex data object" (or "CDO") as used in the context of this document refers to the occurrence of a data object that has at least one or more relationships with itself, or at least one or more relationships with one or more other data object(s). In a given instance of a CDO at least one relationship is populated as a link, as defined below. A CDO may have a multiplicity of different relationships with itself or with one or more additional CDOs.

"Relationship" or "data relationship" as used in the context of a CDO refers to the type of logical combination that occurs between a data object with itself, or refers to the type of logical combination that occurs between a data object and at least one another data object. Among other references or descriptions, such a relationship is always referred to or partially described by a "relationship type". This term is used in an object oriented language context to reference or describe any expectations, actions and limitations possible between two or more data objects.

"Relationship type" in the context of this document is a label that specifies the possible multiple combinations that can occur between a CDO and itself or with at least one other CDO. The possible relationship type labels are 1—1 (one to one), 1-M (one to many) and M—M (many to many). A given CDO may be simultaneously related to more than one other CDO through several different types of relationship. This is also sometimes referred to as the multiplicity of the relationship.

"Link" as used in this document with respect to a CDO identifies a particular occurrence of a relationship between a CDO and itself, between a CDO and another CDO. The occurrence of at least one populated link results in an instance of the CDO. This may be considered a synonym for a "relationship" between two objects.

"Circular link" as used in this document with respect to a CDO identifies a particular occurrence of a relationship between a CDO and itself that may be direct or indirect (e.g., linked to itself through another CDO).

"Relationship definition" or "relationship description" in the context of this document and computer software applications refers to information, or an abstraction of information, regarding a "relationship", "data relationship" "relationship type" or a "link" that can be stored, accessed, transferred, communicated, displayed or edited.

"Complex data object graph" or "CDOG" is a term employed herein as an abstraction to logically represent a set of complex data objects and a set of their corresponding relationships.

"Java data object graph" or "JDOG" is a term employed herein as an abstraction to logically represent a set of complex data objects and a set of their corresponding relationships that are part of a Java programming application.

"Application model" or simply "model" are essentially interchangeable terms employed herein as abstractions to logically convey a collective description or other representation for a set of complex data objects and a corresponding description or other representation of their relationships. In one respect, these terms are used logically herein provide a general way of efficiently communicating when referring to set of metadata (i.e., data about data) that describes possible data entities (e.g., objects, database tables, maps, etc,) data relationship types, and data constraints involved in a computer system or application, or in a specific instance of an application. It is important to understand the context in which the terms "application model" and "model" are used in this document. Ordinarily computer engineers refer to the "model" as an abstraction rather than a specific possibility or instance of the model as applied. However, in this document for the ease of communication abstractions of the model, possible implementations of the model and instances of the model are all referred to generally as "application model" or "model". From the context of its use the term will be clear. The model is the abstract relationship between classes, wherein the CEDO is an instance (or set of instances) that express(es) the model.

"Navigation", "navigating" or "navigated" in the context of the present document refers to an action implementing at least one object to interact with a set of related objects for a certain purpose, such as creation, access, insertion, modification and deletion of an object, or of one of its relationships. It is the physical act of traversing the relationships, which might be referred to as "walking up or down the graph" in common lingo.

"Navigation model" as used herein is a special type of application model that is applied specifically to a description (or other representation) of how objects can relate to each other and what might be the expected behavior when a CDOG is navigated for a certain purpose.

"Object schema" is a term employed herein as an abstraction referring to the set of data object classes that describe the possible data objects that can be created, modified or maintained in an application, or describing an instance of a set of data object classes in an application.

"Distributed Transparent Persistence" is a term employed herein as an abstraction referring to the concept of providing persistence for a member selected from the group consisting of a data object, a data object graph, associated data and data object relationships in a distributed environment without the need for the insertion of byte code or data objects in an object model or schema.

"CocoBase Proxy Classes" is a term employed herein used in referring to wrapper classes that provide CocoBase runtime compatibility for objects that aren't inherently database aware. A computer system can persist the attributes and data for any data object that is wrapped with a CocoProxy wrapper class by simply using CocoBase facilities. For example, source code for the (attribute based) CocoProxy and (get/set method based) CocoProxyM classes are available under the thought\cocodemo3tier31\demos\pguide directory, when the CocoBase software tools suite is installed on a computer system. This optional design provides an extensible mechanism for instances of data extraction and propagation.

"CocoBase Navigation API" is a term employed herein to refer to an example of an API that provides database relationship mapping and object graph management capability for persistent objects. Database relationships are mapped to object links using CocoBase Navigator link definitions. Persistence control is provided at each class level in the object graph. Each of the Select, Insert, Update and Delete operations are individually configurable.

"CocoBase Transaction API" is a term employed herein to refer to an example of an API that provides object oriented transaction support. Transaction objects are used to persist data object attributes and maintain synchronization between database and in memory attribute values. The Transaction API has many built in optimizations, and applications utilizing CocoBase transactions generally benefit from reduced database and network overhead. This facility allows the developer to group together object changes into a single unit of work whose implementation or storage will succeed or fail all at once.

"CocoBase Factories" is a term employed herein to refer to examples of software modules and softwares libraries that are used to provide automated, custom object instantiation behavior. Factory behavior is completely customizable. For example, a factory may be used to bind newly instantiated objects to a transaction object, to load a graph of related objects using the CocoBase Navigator, or to implement polymorphism in a database result set. For example, a ProxyFactory class is part of the current CocoBase software tools suite distribution in the thought\cocodemo3tier31\demos\pguide directory, and this factory returns result set objects wrapped in a CocoProxy wrapper, when a CocoProxy wrapped key object is passed into the CocoBase runtime software module as part of a query that needs processing by the CocoBase runtime module.

"CocoBase Repository" is a term employed herein as an abstraction referring to a datasource to dataobject mapping repository and associated software modules that is installed into a datasource (or may optionally be a single stand alone file, or a set of files that circumscribe a set of datasource to dataobject mapping definitions and associated software modules). A repository can optionally be in a format such as XML, XMI and the like. See, U.S. Pat. No. 5,857,197, the CocoBaseEnterprise O/R Tools Suite, and the co-pending patent application entitled "Dynamic Object-Driven Database Manipulation and Mapping System" for more detailed descriptions of mapping repositories, and the like.

"CocoBase Transparent Persistence for Objects and Object Models". All models using a relational database for map storage require the CocoBase repository to be installed into the database, or in a stand-alone source accessable to CocoBase. The installation of a mapping repository can occur automatically, if required, when using CocoAdmin to log into the database. Pre-existing database tables can be used, provided that the CocoBase repository is first installed into the database, or accessible to CocoBase. Several example of applications that implement CocoBase transparent persistence are included in the CocoBase software tools suite distribution (see the distribution documentation for the location of folders or directories containing such examples).

SUMMARY OF THE INVENTION

An object of the present invention is to provide a system for creating or maintaining transparent persistence of a complex data object, a complex data object graph (CDOG) model, or a portion of a CDOG. In a preferred embodiment, an object of the present invention is to provide such a system that can selectively persist all or a portion of a CDOG model when the model is a member selected from the group consisting of an object model generated from a data object mapping repository and an object model generated from data object modeling tool repository. A further object is to provide such a system is located on, or is part of, a local or distributed computer system.

An object of the present invention is to provide a method for creating, maintaining, accessing, navigating and persisting complex data objects stores in a repository. In a preferred embodiment, an object of the present invention is to provide such a method having the step utilizing the storage facilities of an enterprise EJB server to store and maintain the data object repository. In a further object, such a method involves a local or distributed computer system.

An object of the present invention is to provide a computer software component that operates in an EJB environment, or the like, wherein the component has the capacity to access an object model repository or an instance thereof in a computer memory or in another temporary computer storage store device and persist at least one action selected from the group consisting of creating, maintaining, accessing, navigating, updating or deleting complex data objects as a CDOG model. In a preferred aspect, the computer software component is an Enterprise Bean selected from the group consisting of Stateless, Stateful and Entity Beans. In a further preferred object the computer software component is an EJB Session Bean built on top of CocoBase runtime libraries having the ability to persist all or a portion of a CDOG model or instance thereof. An even more preferred object is to provide such a computer software component capable of transparently persisting all or a portion of a CDOG model or instance thereo for a local or distributed computer system and automatically reconciling and persisting any changes to an instance of the CDOG model or any changes to the repository definition for the CDOG model.

A preferred object of the present invention is to provide a software tool comprising the a navigation API and software components (as described above), adapted for a local network or a distributed network environment, wherein said software tool provides persistence in an object oriented language environment transparently by implementing a configurable network component capable of acquiring and persisting CDOGs through network APIs.

A further object of the present invention is to a software tool capable of reading a source (or binary) programming object logic model or a database file (or other data source containing the stored object model information) in a format selected from the group consisting of a UML data file, a XMI data file, and a XML file and converting the information into a target member selected from the group consisting of a database definition, XML mapping file, a database mapping definition file, and a CDOG definition file. In a preferred object, the software can automatically generate a transparent persistence layer that corresponds to the object model information of the source file.

A further object of the present invention is to provide a software module and source code known as a Java entity bean (such as a generic session bean) that is capable of providing persistence of either or both of a data objects and a data model, in total or in part as determined through setting established by a user of the computer system.

An object of the present invention is to provide a system and/or method for displaying, updating or creating the data or structure of a data object, and optionally its links to other objects of an object model, by utilizing a displayable presentation page having embedded object programming code, such as a Java Server Page (JSP) that is served up by a server platform such as a JSP server, and persisting data of the object, links of the object, or object model by communication of the object programming code embedded in the displayable presentation page with a programming object (such as a Java Bean) wherein the programming object has implemented in its object programming logic methods for getting, setting, resetting and loading of data, and the programming object also includes programming code for communicating directly or indirectly with a persistence manager API or persistence library to persist the object, its data and/or links to other objects in an object model, and optionally to persist the object model itself. In a preferred object of the present invention the displayable presentation page is constructed having an HTML format and the embedded programming language is the object programming language Java, and the associated programming object is a Java Object such as a Java Bean or entity bean.

Another object of the present invention is to provide a system and/or method for generating from a relational datasource schema, or generating from an Object to Relational mapping resource:

a. at least one displayable presentation page (such as a JSP) having object programming embedded within the page, with the presentation page having an ability to display data of an object in an object model, and optionally further display link information and/or to further provide a labeled link button for navigating to a linked object in an object model, and b. generating at least one corresponding programming object, such as a Java Bean, for communicating with the generated presentation page and also for communicating with a persistence manager API that can persist the object, its data and/or links to other objects in an object model, and c. optionally generating a set of related displayable presentation pages (such as JSPs) corresponding to linked objects of a specified object model.

d. optionally comprising an ability to query against the object graph using a object query facility or syntax.

Another object of the present invention is to provide a method of visually navigating, updating and persisting an object model by utilizing linked displayable presentation pages (such as JSPs) corresponding to a specified object model. A preferred object is to provide such displayable presentation pages with buttons that may be clicked to access link information or to move the user forward or backward to a navigated linked object of an object model and its displayable presentation page.

A further object of the present invention is to provide a method for creating, updating, navigating and persisting an object model starting from a information source which is member selected from the group consisting of Java Classes, a relational data source, a UML model (e.g., XMI representation), and interface for manually creating an object model by describing a set of objects, their attributes and their links to other objects, and then in a further step creating from the information retrieved from such an information source a set of displayable presentation pages and their associated programming objects (such as JSPs and associated Java Beans) corresponding to an object model that are suitable for visually creating, navigating or updating the object model.

BRIEF DESCRIPTION OF THE DRAWINGS

For the non-limiting purpose of illustrating some of the concepts of complex data objects CDOs, i.e., data objects and their relationships to one another, according to the invention, two CDO graph drawings

FIG. 1 is a complex data object (CDO) graph drawing, which illustrates a customer object and some of its related objects (billing address, orders and items ordered), as well as relationships between the objects. Relationships of the types 1 to 1 (1—1) and 1 to many (1-M) are shown in this CDO graph. More specifically, FIG. 1 illustrates a CDO graph drawing presenting an instance of a customer object 1 having a 1 to 1 (1—1) relationship (5) with its customer billing address object 10, and a 1 to many relationship (collectively 15, 25, and 35) with the three outstanding order objects 20, 30 and 40, respectively. Order object 20 is an instance of an outstanding order object having a 1 to many relationship (collectively 45 and 55) with the two items ordered objects 50 and 60, respectively. Order object 30 is an instance of an outstanding order object having a relationship with a single order item, but order object 30 has a 1 to many relationship (65) with the item ordered object 70, since many order items could have been associated. Order object 40 is an instance illustrates a 1 to many relationship (collectively 75 and 85) with the two items ordered objects 80 and 90, respectively.

FIG. 2 is a complex data object (CDO) graph drawing, which illustrates a company object and some of its related objects (corporate address object and some of its departments and employees), as well as relationships between the objects. Relationships of all three types: 1 to 1 (1—1), 1 to many (1-M) and many to many (M—M) are shown in this CDO graph. More specifically, FIG. 2 illustrates a CDO graph drawing presenting an instance of a company object 100 having a 1 to 1 relationship (650) with its corporate address object 700, and a 1 to many relationship (collectively 150, 250, and 350) with the three company department objects 200, 300 and 400, respectively. Since employees of this company may work for more than one of the company's departments, the company department objects 200, 300 and 400 in FIG. 2 are three instances (many) of company department objects having relationships (425, 450, 550 and 575, respectively) with two (many) employee objects (respectively, 500 and 600). The cross-assignment of employee object 500 to both company department objects 200 and 300, and of employee object 600 to both company department objects 300 and 400, illustrate a complex many to many (M—M) relationship of departments to employees for this company.

DISCRIPTION THE INVENTION

Figure 1:
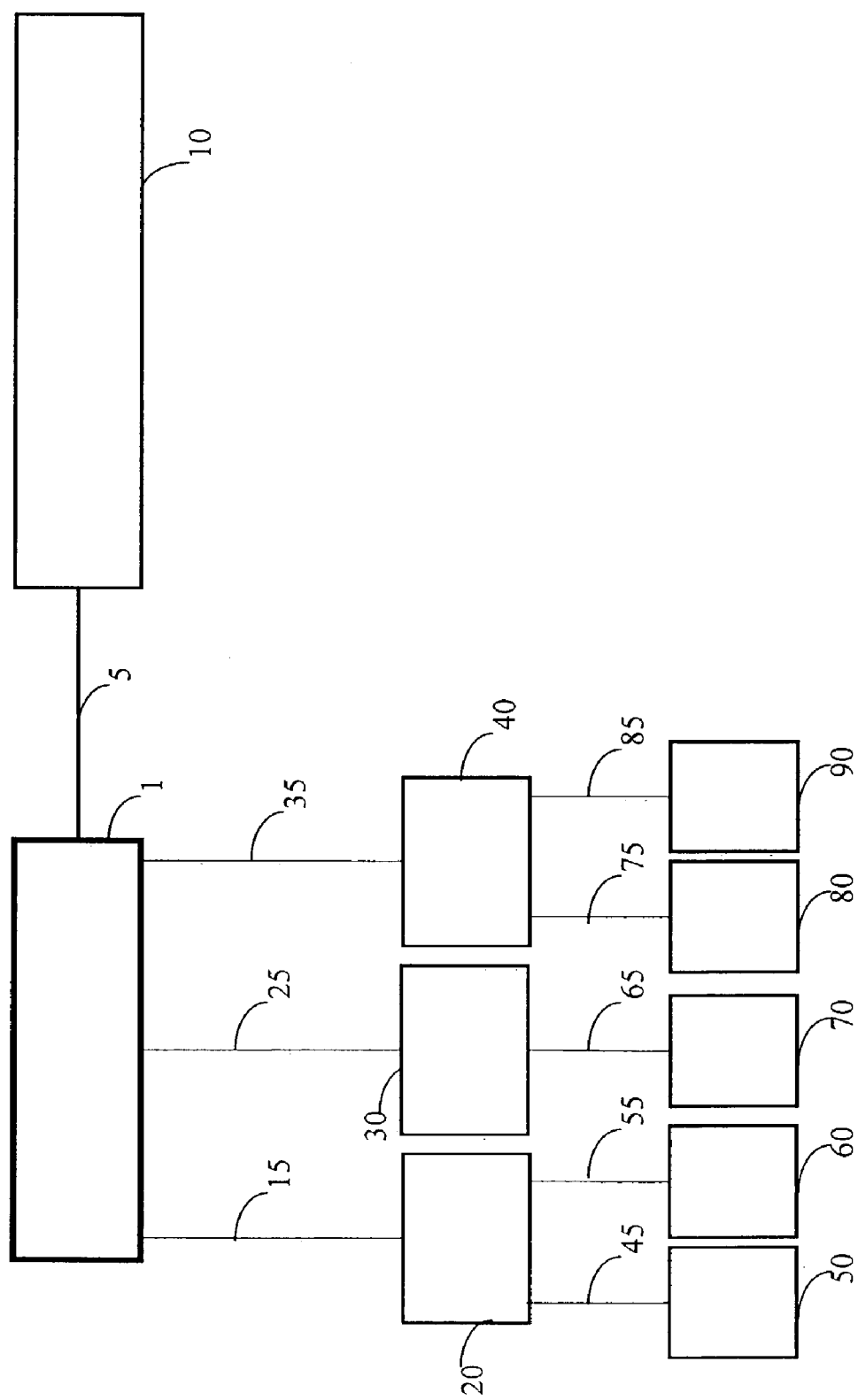
FIG. 1 and FIG. 2 are provided.

The present invention provides a system for creating or maintaining persistence for all or a part of a complex data object graph model when a user is creating, maintaining, accessing and navigating complex data objects as a complex data object graph model. In one embodiment, the system comprises a computer system having a user interface, a working memory storage area and at least one device for permanently storing information, and said system being loaded with at least one portion of a computer software program, wherein said software program comprises at least one user access interface and a set of programming routines designed for creating or maintaining transparent persistence when a user is creating, maintaining, accessing and navigating complex data objects as a CDOG model, comprising a) a set of definitions for the relationships between a data source schema and objects capable of storing data for an object language application, wherein the set of definitions is stored in a repository;

b) a set of definitions for the relationships between objects for an object language application, wherein the set of definitions is part of an object application navigation model;

c) a list of objects, or a set of objects that are to be persisted, wherein the list of objects or set of objects is part of an object application navigation model;

d) an object or set of objects as a programming module that contains the logic for persisting an indicated object or set of objects from c);

e) an input method to inform the programming module of d) with the location of information corresponding to a), b) and c), and f) at least one data source to store persisted data.

In a preferred embodiment, the present invention provides such a system that can persist any part or all of a CDOG model instance, and to resolve and persist any changes to the model or to the respository for the CDOG model. Most preferred is such a system providing a point and click graphical user interface.

The present invention provides a method for creating, maintaining, accessing, navigating and persisting complex data objects stores as a CDOG model and providing transparent persistence in a distributed environement, comprising the steps of:

a) creating or accessing a CDOG representation definition or accessing an instance of the CDOG, b) monitoring and recording any changes to the CDOG or a portion thereof on a local or distributed computer system, and c) persisting any changes to the CDOG on a local or distributed computer system by updating the CDOG or CDOG representation definition to reflect and changes to any copies of the CDOG or CDOG representation definition, and saving a copy of the updated CDOG representation definition to a data source or to another type of information repository.

In a preferred embodiment, the present invention provides such a method wherein the information repository is an object data store managed by an EJB Enterprise server. In a further preferred embodiment an EJB Enterprise Java Bean is the software component having the ability to access a CDOG repository file, a UML/XMI repository, or other mapping definition repository (e.g., file, database, or streaming data source) or an instance of the at least one portion of the CDOG in a computer's memory or on a distributed network and provide the transparent persistence for the CDOG model.

The present invention provides a computer software program having at least one user interface and having at least one feature that provides for at least one action selected from the group consisting of creating or maintaining transparent persistence when a user of a CDOG model is creating, maintaining, accessing or navigating a CDOG model. In a preferred aspect of the invention, the present invention provides a software program, or an association with a software program, having a feature for displaying, printing or displaying and printing a representation of the CDOG model as a graph, or as a set of tables representing a CDOG model. In a further preferred embodiment, such a software program has an editing interface for editing the CDOG model, or has an editable input or source, such as a file, that can be modified to implement changes to the complex data object CDOG model (or has both an interface for editing and an editable input or source, such as a file).

The present invention also provides an application programming interface ("API"), as a preferred embodiment, wherein the API can be accessed to create, maintain, access, navigate and persisting complex data objects as a CDOG model. In one aspect the API can be accessed by an independent computer software program, or by a computer software program module that is part of a software package including the API, to provide at least one action selected from the group consisting of creating, maintaining, accessing, navigating and persisting complex data objects as a CDOG model. In a preferred aspect, the present invention provides such an API as part of a software tool package that provides a method for displaying or printing a representation of the CDOG model as a graph or set of tables representing the CDOG model (or providing methods for both displaying and printing a representation of the CDOG model). In another preferred aspect, such a software tool package that includes the API provides an editing interface for editing the CDOG model, or has an editable input or source, such as a file, that can be modified to implement changes to the CDOG model (or provides both an editing interface and an editable input or source, such as a file,).

A preferred embodiment of the present invention provides a software tool comprising the API according (as described above), adapted for a local network or a distributed network environment, wherein said software tool provides persistence in an object oriented language environment transparently by implementing a configurable network component capable of acquiring and persisting CDOGs through network APIs.

Figure 2:
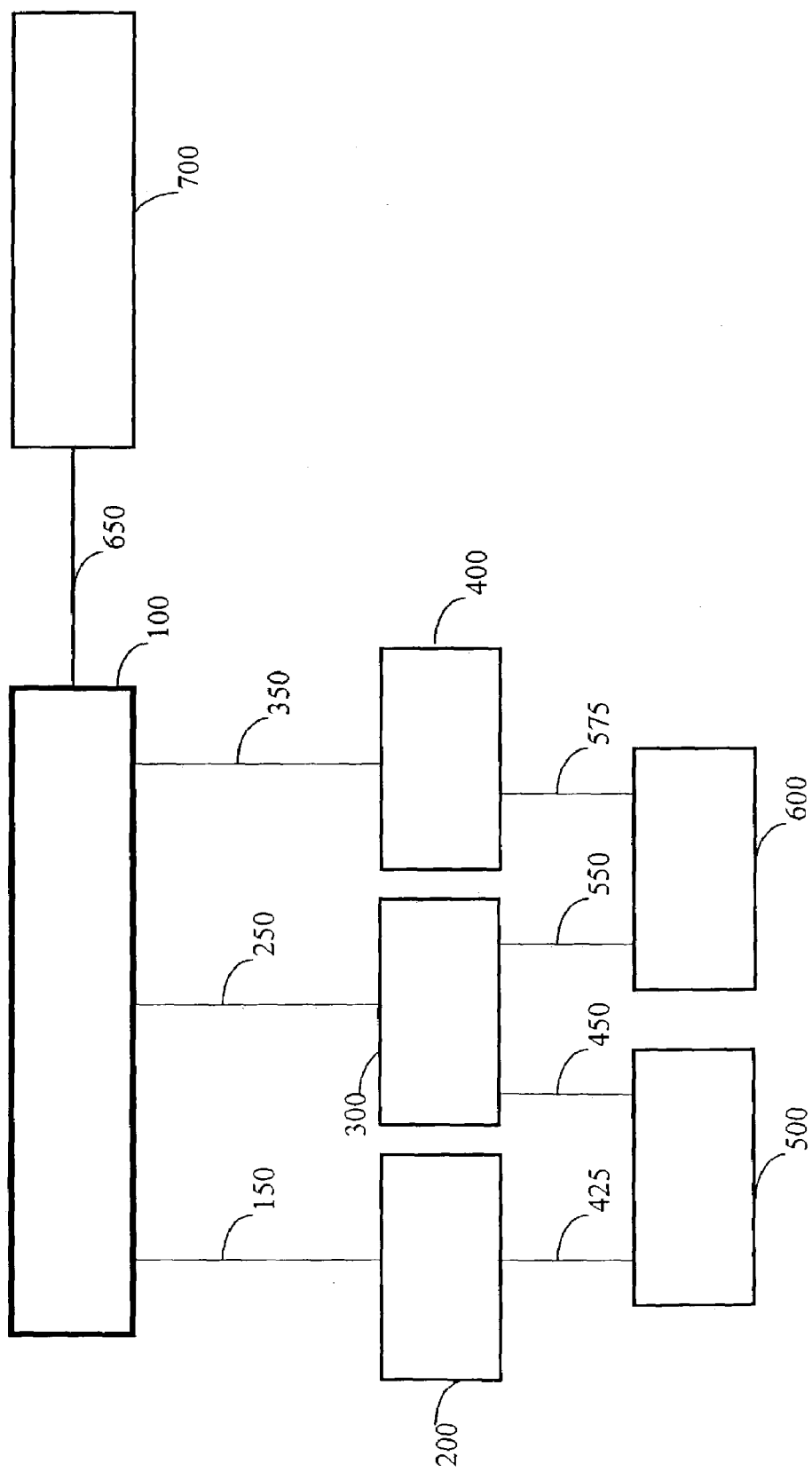
Figure 3:
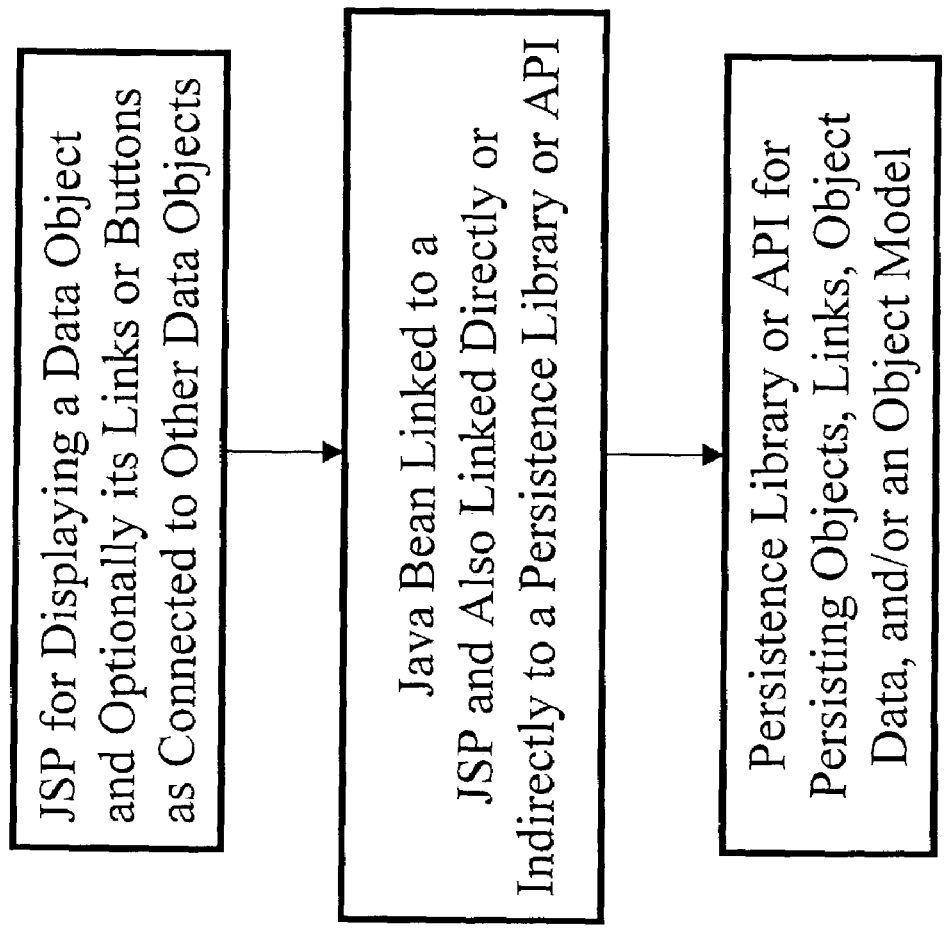
FIG. 3 is a programming flow chart representing a preferred embodiment of the invention which is a system for creating, displaying, updating, and persisting the data and/or links of a complex data object (CDO) which is part of a CDO graph. The first programming module of the illustrated flow chart utilizes a displayable presentation page having embedded object programming code, such as a Java Server Page (JSP), wherein the displayable presentation page may be served up (presented) to a user by a server platform such as a JSP server. This displayable presentation page, among other things, may display the data of a data object and/or provide an interface for creating or updating the data for that data object (or for a new data object) and the displayable presentation page may also include one or more link names (or labelled link buttons) as connected to other data objects of the CDO graph/model. The embedded programming code of the displayable presentation page includes (i) logic for accessing data and and displaying the data from a particular data source and the logic may may perform this function directly or delegate it to at least one other programming module, (ii) logic for creating, updating or deleting data of an object, (iii) a programming reference link to an associated programming object (such as a Java Bean) that is, in turn, directly or indirectly connected to a programming module that contains additional logic for detecting changes to object data and/or changes to the object graph/model that includes the particular object or is associated with it, and (iv) logic for reflecting to the associated programming object the data and/or links to other objects of the data object that is being displayed by the presentation page. The second programming module of the illustrated programming flow chart is the programming object (such as a Java Bean) that is linked to the first programming module which is linked to at least one data object and is further linked to a third programming module (either directly or indirectly, such as through an API) which is a programming module and/or library that includes programming logic for for tracking and persisting to at least one data source changes to objects, object model links, object data and/or an object model. This second programming module contains programming logic (a) for issuing commands such as get, set, reset and load attributes of a dat object, (b) for detecting changes to one or more of an object, links between objects, or object model, (c) link to a third programming module for persisting the detected changes. The third programming module of the illustrated programming chart provides a persistence library or API with associated programming logic for tracking and persisting to at least one data source the changes to objects, object model links, object data and/or an object model associated with the displayable presentation page of the first programming module in the flow chart when it is notified of such changes by the second programming module. In one preferred embodiment the displayable presentation page includes buttons to links with related objects of an object model, the programming flow chart also represents the embodiment of a method for visually navigating a populated or unpopulated object model graph and/or its data and links between its objects.

In another preferred embodiment, the CDOG API is the CocoNavigator API, the Navigator API, or the CBFacade API, which provides support for manipulating complex objects in conjunction with the THOUGHT Inc. CocoBase Enterprise Object/Relational (O/R) database (hereinafter "CocoBase") mapping tool (see U.S. Pat. No. 5,857,197 (incorporated herein in its entirety), for concepts upon which the CocoBase mapping tool is based). An object is considered to be complex when it has established or potential relationships (i.e. links) to other objects. For instance, a Company object instance may be linked to an instance of its corporate address and instances of a Department object, which in turn may be linked to a set of instances of Employee objects. An example of such an CDOG is shown in FIG. 2, for example. The combination of these objects and their links constitute a graph of objects (CDOG model) that can be manipulated using the CocoNavigator API. Since the CocoNavigator API works in a Java Programming language environment, this CDOG example may also be referred to as a JDOG example.

In one preferred embodiment, the invention provides a software module, or set of modules, for creating or maintaining transparent persistence of a member selected from the group consisting of a data object, an object graph model and a portion of an object graph model when a user of the system is creating, maintaining, accessing or navigating complex data objects as a CDOG model, comprising:

i) a software module for creating a set of definitions for the relationships between a data source schema and objects capable of storing data for an object language application, wherein the software module is capable of causing the storage of the set of definitions in a repository;

ii) a software module for creating and accessing a set of definitions for the relationships between objects for an object language application, wherein the software module is capable of causing storage of the set of definitions in a navigation model;

iii) a software module providing an input means for a member selected from an object name, a list of objects, or a set of objects that are to be persisted, wherein the software module is capable of capable of causing the storage of the input as part of a navigation model that can be access by ii);

iv) a software module containing the programming logic to persist an object or set of objects based upon access to (a) a set of definitions for the relationships between a data source schema and objects capable of storing data for an object language application, (b) a set of definitions for the relationships between objects for an object language application, and (c) an object name, a list of objects, or a set of objects that are to be persisted, and v) a software module having an input method capable of informing iv) of the location of information relating to iv)(a), iv)(b) and iv)(c).

In another preferred embodiment, the invention provides a software tool comprising the API according to the invention or interfacing therewith, wherein the software is adapted for performing the following steps:

a) reading or accessing an object model definition from a repository based O/R mapping tool (e.g., from a defined repository such as a file, database or streaming source) or from a modeling tool defined repository source in a format selected from the group consisting of a database schema, a source or binary object graph, Unified Modeling Language ("UML") data file, an XML Metadata Interchange ("XMI") data file, an Extensible Markup Language ("XML") file, and other general data formats; and b) converting the information of (a) into a target member selected from the group consisting of a database defintion XML format, a database mapping definition format, other general data formats, a source or binary CDOG definition file, and application objects.

In a further preferred embodiment, the present invention provides a software tool as described above that is adapted for performing at least one of the following additional steps:

a) displaying an object model, definition or portion thereof in a format selected from the group consisting of a database schema, a source or binary object graph, Unified Modeling Language ("UML") data file, an XML Metadata Interchange ("XMI") data file, an Extensible Markup Language ("XML") file, and other general data formats;

b) storing a representation of a object model, defintion, or portion thereof in a repository (or temporary computer memory representation) in a format selected from the group consisting of a database schema, a source or binary object graph, Unified Modeling Language ("UML") data file, an XML Metadata Interchange ("XMI") data file, an Extensible Markup Language ("XMI") file, and other general data formats;

c) printing a representation of a object model, defintion, or portion thereof in a repository (or temporary computer memory representation) in a format selected from the group consisting of a database schema, a source or binary object graph, Unified Modeling Language ("UML") data file, an XML Metadata Interchange ("XMI") data file, an Extensible Markup Language ("XMI") file, and other general data formats;

d) displaying the target information of (b);

e) generating at least one application object from the information of (a) or (b); and f) printing the target information of (b).

In a still further preferred embodiment the software tool described above provides target information that is at least one member selected from the group consisting a CocoBase database definition repository, a CocoBase map, a CocoNavigate CDOG definition, a CocoNavigate object link descriptor, and a CDOG object graph definition capable of being stored and retreived. Further preferred is such software, wherein the source is a UML/XMI document containing sufficient DTD information to exchange modeling information with a UML modeling tool.

In one embodiment of the software tool according to the invention, the software tool can be set to automatically generate a persistence layer that corresponds to the source UML class diagrams provided by an exported source file from a case tool capable of exporting UML/XMI, such as Rational Rose, Together and ArgoUML.

An easy way to understand the job performed by a CDOG Navigator API, such as the CocoNavigator API, is to imagine it as a monitor that can provide at least one object to intercept any accesses to the data objects and their relationships that constitute the CDOG, as well as any changes to the data source upon which the CDOG depends, in order to provide a means to persist any changes to the CDOG (or CDOG model) or related data in the data source. Any changes to the CDOG (or CDOG model) can then be propagated by the CDOG Navigator API to a persistent data source through a CocoBase Enterprise O/R connection. Similarly, persistent data that updates a data source can be utilized to create a CDOG model or to update a CDOG model.

Each CDOG (or CDOG model) managed by the CDOG Navigator API can be associated by the CDOG Navigator API with a CDOG descriptor (such as a file) that may be utilized to represent all or part of a "navigation model". In this respect, a navigation model may be abstractly described as essentially a namespace in which a set of data objects and a set of link descriptions (i.e., relationship types between data objects) are each defined. In a preferred embodiment, a data source, data field, data field size and data field type are listed for each data object in the set of data objects. In another preferred embodiment, at least one link description for two data objects, or for a single data object having a circular link (where the link description is utilized in conjunction with the CocoNavigator API and CocoBase mapping tool) contains one or more of the following types of information (however other related information may be utilized):

at least one link type (e.g., 1:1, 1:M, M:1 and M:M) between data objects at least one link qualifier (currently supported qualifiers are STD and BEAN)

at least one associative CocoBase map (optional, for M:M links only)

the names of the CocoBase maps related to each of the data objects (usually two maps that are not necessarily distinct), and information that may be obtained for each of the CocoBase maps related to the relationship between two data objects, including:

the name of a relationship link between the two data objects the names of the fields (i.e., keys) in a CocoBase map that are used to establish a relationship link between two data objects the name of a data source for each of the fields (i.e., keys) in a CocoBase map that are used to establish a relationship link between two data objects the names of the fields (i.e., keys) in the associative CocoBase map (optional, for M:M links only)

the names of a data source for each of the fields (i.e., keys) in the associative CocoBase map (optional, for M:M links only)

the name(s) of any java classes corresponding to fields that would impact upon the relationship between two data objects a setting parameter indicating whether the a loading of a particular CocoBase map that will impact upon a relationship between two data object should be cascaded to other related map(s)

a setting parameter indicating whether a deletion of information from a particular CocoBase map that will impact upon a relationship between two data object should be cascaded to other related map(s)

a setting parameter indicating whether an insertion of information into a particular CocoBase map that will impact upon a relationship between two data object should be cascaded to other related map(s), and a setting parameter indicating whether an update of information in a particular CocoBase map that will impact upon a relationship between two data object should be cascaded to other related map(s).

Some preferred features provided by the CocoNavigator API and its associated software, when utilized with the CocoBase mapping tool, or with a similar mapping tool, are as follows:

(a) Provides Multiple Navigation Models for the Same CDOG Model

A preferred embodiment of the CocoNavigator API or an associated program module is configured to allow many navigation models to be used with the same set of java classes and CocoBase maps that are associated with a CDOG model. This preferred embodiment API, or an associated computer program module, may also be configured to permit a user to switch dynamically from one such navigation model to another. Thus, while a given application is being executed, it is possible to completely change the relationships between data objects and how CDOGs of a CDOG model should be managed.

(b) Circular Link Definitions

A preferred embodiment of the CocoNavigator API, or an associated computer program module, is configured to permit a user to create, access, support and correctly manage circular data object links. In a navigation model, a circular link may be defined as occurring when a data object is directly or indirectly linked to itself as part of a CDOG. Such relationships can be created, accessed, supported and correctly managed via the CocoNavigator API.

(c) Bi-Directional and Oriented Links

A preferred embodiment of the CocoNavigator API, or an associated computer program module, is configured to permit a user to create, access, support and correctly manage links between data objects as either a bi-directional link or as an oriented link. In this embodiment links between data objects are usually bi-directional links and can be navigated back and forth as an un-oriented navigational model of the CDOG model. With such a bi-directional link feature activated, any object in the navigation model in a given CDOG model can be used as a navigation entry point. In an oriented link navigation model, the link may be set as an oriented link accessible from a single direction. Thus, changes must be made from top down or from bottom up on a relationship tree representation of the navigation model, and some actions may need to originate from a pre-set node of the relationship tree. In this embodiment, such types of links can be created, accessed, supported and correctly managed via the CocoNavigator API.

(d) Dynamic Link Proxy Properties

In a preferred embodiment, the CocoNavigator API, or an associated computer program module, is configured to permit a user to populate any object property (e.g., public field or a getter/setter pair) having its type declared as an object class with special dynamic proxies that can monitor and update the state of a relationship link. Examples of such types of object classes are thought.Cocobase.navapi.LinkObjProxy of CocoBase and subclasses of the Sun Microsystems java class, java.util.Vector or other similar collection classes. Bi-directional or single directional object references can be consistently maintained in this manner, or by other similar logical mechanisms.

(e) Automatic Synchronization of Object Properties

In a preferred embodiment, the CocoNavigator API, or an associated computer program module, can be configured to automatically merge a data object and its properties into a CDOG navigation model representation when the class of object being navigated (being created, accessed, supported or maintained) has a property (e.g., a field or a getter/setter pair) with a name matching the name of a corresponding link as defined in the navigation model.

(f) Pure Object Models

In a preferred embodiment, the CocoNavigator API, or an associated computer program module, can be configured to include a data object as a relationship link to another data object in a navigation model without the need to declare fields and properties for the data object. Such links should be limited however to cases where no computer code dependency will exist between the java classes that will be associated with such linked data objects of the navigation model. Thus, such a navigation model can be a pure abstraction, and more reusable than just a populated version or single hypothetical instance of the abstraction.

(g) Customized Link Visitors

In a preferred embodiment, the CocoNavigator API, or an associated computer program module, can provide an interface which can be configured to permit a visitor object to use this interface to visit (e.g., access or change) a data object that is part of a CDOG navigation model. In conjunction with CocoBase, an example of CocoNavigator API implementing this concept might using a LinkVisitor object (class). Other similar classes may be defined for this purpose. The visitor interface provides a way for a user to customize and adapt the software, and thereby allows a user to extend the functionality of the CocoNavigator API, or the functionality of an associated computer program module, to provide a desired customizable behavior in their CDOG navigation model.

(h) Distributed Environments

In a preferred embodiment, the CocoNavigator API, or an associated computer program module, can be configured to operate as a tool to create, access, support and correctly manage a CDOG navigation model in a server environment (e.g., in an EJB container) and to persist any changes to the CDOG navigation model when a navigation model is distributed across a local network or when the navigation model involves a distributed network (e.g., a navigation model distributed across internet connections). In one aspect, on the server side of the network, a CDO or a CDOG model of any complexity sent by clients (e.g., serialized copies) across a local network, or across a distributed network, can be correctly merged into a CDOG model by the CocoNavigator API, or by an associated computer program module. Additionally, the CocoNavigator API, or an associated computer program module, can be configured to send a CDO or CDOG model to a client along with link proxies serialized with parts of the CDO or CDOG model that are being monitored by such link proxies. By sending the CDO or CDOG model copy along with such link proxies and associated parts of the CDOG or CDOG model to a client, dynamic link proxies (described above in (d)) can be used by the client side. Accordingly, a CDOG navigation model can be created, accessed, supported, managed and persisted over a distributed network.

(i) Group Loading or Lazy Loading of Links

In a preferred embodiment, the CocoNavigator API, or an associated computer program module, can be configured to monitor some or all of the data objects (and associated relationship definitions) participating in links of a CDOG navigation model. In a more preferred embodiment, the data objects (and associated relationship definitions) participating in links of a CDOG navigation model can be loaded as they are needed (lazy loading) from a persistent data source or from another type of information repository. This lazy loading feature can permit a very large CDOG navigation model to be loaded in a per-link basis as needed. In a more preferred embodiment, the lazy loading feature can be configured to prevent a link from being loaded twice and can be configured to detect cycles of related loads that have been previously loaded. Such configuration adaptability can be exploited to provide the more efficient use of the resources for a computer system or network or for a distributed computer network.

Some examples of preferred features that can be provided by the CocoNavigator API and its associated software, which are particularly enhanced when utilized with the currently existing CocoBase mapping tool, are as follows:

(aa) CocoBase Transactions

A preferred embodiment of the CocoNavigator API or an associated program module is configured to bind a data object or data object relationship of a CDOG navigation model with a CocoBase transaction. Such configurations may be utilized to optimize access to the database server and to enhance performance of the computer system, or systems, involved with the CDOG navigation model.

(bb) Non-CBProp Objects

The CocoNavigator API or an associated program module can be configured to automatically detect non-CBProp objects (objects with classes that do not implement the CocoBase persistence interface known as the CBProp interface), and automatically create proxies in order to persist such objects as part of a CDOG navigation model. This is based on the Java Bean naming patterns in the Java Language specification of Sun Microsystems, Inc.

(cc) Virtual Foreign Key Fields

The CocoNavigator API or an associated computer program module can be configured to use proxy classes of CocoBase, such as the CocoProxyM classes, when appropriate. Implementing proxy classes such as the CocoProxyM classes can provide a system for creating, accessing, supporting, properly maintaining and persisting virtual foreign key fields (i.e., foreign key fields do not need to be defined in the object class for Java programming implementations) by the CocoNavigator API, or by an associated computer program module.

(dd) Transparent Persistence

The CocoNavigator API or an associated computer program module can be configured to use a configurable network component capable of acquiring and persisting CDOGs through network APIs and thereby provide persistence transparently with respect to the applications that are using the CDOGs. In a preferred implementation, there is provided a software tool comprising the CocoNavigator API that is adapted for a local network or for a distributed network environment, wherein the software tool provides persistence in an object oriented language environment transparently by implementing a configurable network component capable of acquiring and persisting CDOGS. Such a concept may be referred to as transparent persistence in the context of this API, because persistence can be obtained without requiring reconfiguring of an existing CDOG model or software application in order to provide such persistence to a computer software application.

(ee) Transparent Persistence with Automated APIs that may be Further Optionally Utilized with a Local or Distributed Implementations Such as a Session Bean Implementation The CBFacade or other modules containing high level API's can be utilized that can function in place of the CocoNavigator API (or co-ordinate with it) to automate many of the transparent persistence functions. Such a software module or modules can be utilized in concert with a local or distributed implementation such as a session bean to provide an easier and quicker establishment of transparent persistence. The CBFacade can provide the functions as defined in (dd) and the session bean can provide a communication link between modules such as a transaction API and the navigation API (and/or with the CBFacade) to assure that transparent persistence occurrs as required. Such transparent persistence in the context of this API can be obtained without requiring reconfiguring of an existing CDOG model or software application in order to provide such persistence to a computer software application.

From the above description of features of the API, and the features of the CocoNavigator API programming routines described below, an object computer language programmer can produce an API having the functionality of the CocoNavigator API described herein. Essentially the CocoNavigator API has an at least one user access interface, at least one data source access interface and at least three main programming modules consisting of the following programming modules or routines:

I. A programming module or routine constructed to operate on a computer system and to provide the following features to a user or to a software program module of the computer system:

a) a computer programming sub-routine or sub-module for obtaining from a member selected from the group consisting of a data source, an information repository, and an input device, sufficient information to construct a CDOG model containing one or more CDOGs, b) a computer programming sub-routine or sub-module for constructing and loading into the memory registers of the computer system a CDOG or a CDOG model representation definition from a data source or other repository, and c) a computer programming sub-routine or sub-module for sending a copy of some portion or all of the CDOG representation definition to a user or to a software program module on a local computer system or on a distributed network;

II. A programming module or routine constructed to operate on a computer system and to provide the following features to a user or to a software program module of the computer system (i.e., a persistence manager)

a) a computer programming sub-routine or sub-module for monitoring a user or a software program module on a computer system that has accessed or changed a portion of a CDOG or CDOG model, which is included in the CDOG, or CDOG model, representation definition of (I), above, and obtaining any changes to the CDOG or CDOG model, b) a computer programming sub-routine or sub-module for monitoring a user or a software program module on a computer system who has obtained a copy of any portion of the CDOG, or CDOG model, representation definition, and for obtaining a copy of any changes that the user might have made to any portion of the CDOG, or CDOG model, representation definition, and c) a computer programming sub-routine or sub-module for comparing a copy of a CDOG, CDOG model, or a representation definition of either the CDOG or CDOG model, to an original stored version of the CDOG, CDOG model, or an original stored representation definition for the CDOG or CDOG model, and for updating the original to incorporate any changes to a CDOG or a representation definition that are made by the user or by a software program module; and III. A programming module or routine constructed to operate on a computer system and to provide the following features to a user or software program module of the computer system:

a) a computer programming sub-routine or sub-module for storing a new CDOG or CDOG model, or storing a definition of either the CDOG or CDOG model, in a data source or in another information repository, and b) a computer programming sub-routine or sub-module for persisting (saving to permanent storage) either a changed portion of an updated CDOG, an updated CDOG model, or an updated definition representation for either a CDOG or a CDOG model, to a data source or to another type of information repository.

In a more preferred embodiment, the CDOG API according to the invention, (a preferred embodiment is the CocoNavigator API) can be written with an interface that accesses and uses functionalities of the CocoBase mapping tool, associated programming routines, or associated class libraries. Both the object code and the source code of the CDOG API are contemplated as part of this invention.

In another preferred embodiment, the above described CDOG API can be accessed to create, maintain, access, navigate and persisting complex data objects as a CDOG model. In a particularly preferred aspect, the API can be accessed by a computer software program such as the CocoBase mapping tool, or by a computer software program module that is part of a software package including the API, to provide at least one action selected from the group consisting of creating, maintaining, accessing, navigating and persisting complex data objects as a CDOG model. In an even more preferred aspect, the present invention provides such an API as part of a software tool package having a feature or method for displaying or printing a graph or set of tables representing a CDOG or a CDOG model. In yet another preferred aspect, such a software tool package including the API provides an interface for editing a CDOG, a CDOG model, or for editing a representation definition for a CDOG or a CDOG model to provide a modification that implements a change to a CDOG, or to its definition.

As described above, a software component according to the invention that is capable of persisting all or a portion of a CDOG may be an Enterprise Java Bean selected from the group consisting of Stateless, Stateful or even Entity Beans. CocoBase Enterprise Beans (CBEBs) are a preferred embodiment of the invention and constitute a set of Enterprise Java Beans built upon or accessing CocoBase Runtime and EJB APIs to provide persistence in a generic, efficient and transparent way. Distributed transparent persistence can be provided without the need for any object model changes or byte code modifications. CBEBs can be directly deployed on an EJB server with or without customized settings and are capable of persisting virtually any Java Object, any Java Object graph or any portion of the Object graph. The Java Objects of any complexity that are arbitrarily created by client applications can be persisted, and the corresponding object classes can be properly mapped to a CocoBase repository or other object repository such as a UML XMI repository. Copies of the Java Object, any portion of an Object Graph, or all of an Object Graph can be automatically reconciled and the changes can be persisted to a storage repository.

The CocoBase Navigation API maps database foreign key-primary key relationships to object references. The relationship maps (sometimes referred to herein as navigation models), like the database maps, are stored in a special CocoBase repository, or may be converted into an XML file (or files) and stored in a stand-alone file or directory. The Navigation API supports 1 to 1, 1 to M, and M to M links in both the object and relational spaces. For M to M relationships, an associative table and a corresponding associative map are required, since relational databases do not directly support M to M relationships.

A navigation model must be created, or properly reference, before CocoBase links can be defined. A navigation model is a namespace used to categorize and store a set of link definitions. Generally, a single navigation model is sufficient for simple applications. Multiple navigation models are useful if an application switches between several relationship configurations. This allows different views of complex object data for the same set of underlying database tables. Having relationship mapping separated from table mapping is unique to CocoBase. Since maps can be used with multiple link models, it provides reusability at the mapping level.

Below is an example of how a client application on an EJB Server could connect to and use at least on CBEB to provide transparent persistence, even in a distributed environment.

EXAMPLE 1

```
// create a complex object having myObj as the root of the tree
...
Context initialContext = new InitialContext( );
SfCmbHome cmbHome =
(SfCmbHome)javax.rmi.PortableRemoteObject.narrow(
        initialContext.lookup("java:comp/env/ejb/sfcmbhome"),
    SfCmbHome.class);
    SfCmb myCmb = SfCmbHome.create(. . ./*connection
details*/. . .);
    // create an example object
    MyObject myObj = new MyObject( );
```

-continued

```
        myObj.setSomeField(someValue);
        // now ask the CMB to load the object from the database that
matches the example
        myObj = myCmb.retrieveState(myObj);
        myCmb.saveState(myObj);
        . . .
        // do some more changes to myComplexObject and save it
        again
        . . .
        myCmb.saveState(myObj);
        . . .
```

The above example can also be use to run a client application with the TomCat Server using a JSP to access a relational database (such as the Oracle Database) using at least CBEB to provide transparent persistenct, even in a distributed environment. Appendix 1 has more details of how this can be done.

Below is another example of how a client application on an EJB Server could connect to and use at least on CBEB to provide transparent persistence, even in a distributed environment. This example uses the CBFacade implementation.

EXAMPLE 2

```
        // create a complex object having myObj as the root of the tree
        . . .
        CBFacade cbf =
        CBFacade.create("thought.CocoBase.CBFacadeLocal");
        Properties props = new Properties( );
        props.put("cocosource.name",args[0]);
        props.put("cocosource.jdbcdriver",args[1]);
        props.put("cocosource.url",args[2]);
        props.put("cocosource.user",args[3]);
        props.put("cocosource.password",args[4]);
        props.put("cocosource.navmodel","CompanyAppLinks");
        cbf.connect(props);
        // create an example object
        MyObject myObj = new MyObject( );
        myObj.setSomeField(someValue);
        // now ask the CMB to load the object from the database
that matches the example
        myObj = cbf.load(myObj);
        cbf.save(myObj);
        . . .
        // do some more changes to myComplexObject and save it
        again
        . . .
        cbf.save(myObj);
        . . .
```

The present may be embodied in specific forms other than those particularly described above or illustrated by the appended drawings. Upon viewing the present application preferred embodiments and other descriptions herein of the present invention, variations and other implementations that do not depart from the spirit and scope of the present invention will be apparent to one of routine skill in this field. Such variations and other implementations are considered part of the present invention and within the scope of the appended claims. Accordingly, reference should be made to the appended claims, rather than to the forgoing specification and drawings, as indicating the scope of the present invention.

Appendix 1: A JSP Example Using the TomCat
Server and a Relational Database and Providing
Transparent Persistence using CocoBase Enterprise
OR I. Set up a relational database such as Oracle 8i and create a user called cityinfo.

II. Install TomCat as follows:

1. Install the TomCat Server 4.0.x by simply unpacking the binary distribution (.zip) into a convenient location.

On a Windows platform, open a command prompt and proceed as follows:

C> cd \

C> jar xf jakarta-tomcat-4.0.x.zip

On a Unix platform, open a command prompt and do something like:

/usr/local/bin% jar xf jakarta-tomcat-4.0.x.zip

2. Run the script jakarta-tomcat-4.0.x/bin/startup and open a browser on http://localhost:8080 to test the installation. The Jakarat Project Home page displaying the Tomcat logo will appear in your browser.

3. Run the script jakarta-tomcat-4.0.x/bin/shutdown to stop the server.

III. Configure the Environment as follows, while adjusting the environment to match a chosen relational database (this example uses Oracle8i as the relational database):

The following system variables are set for the applications to access the proper files and libraries. Set these variables through the Windows Control Panel under the System properties dialog. Example entries for these variables are listed below:

| Variable | Entry | Description |
| --- | --- | --- |
| JAVA_HOME | C:\jdk1.3.1 | JDK home directory |
| PATH | C:\CINNT\System32;%JAVA_HOME%\bin | JDK utilities Windows executables |
| COCO_HOME | C:\thought\cocodemo3tier31 | CocoBase home directory |
| CATALINA_HOME | C:\jakarta-tomcat-4.0.1 | TomCat home directory |
| ORA_HOME | C:\Oracle\Ora81 | Oracle home directory |

IV. Installing CocoBase Enterprise O/R

Before installing CocoBase Enterprise O/R, confirm that it is a current release. The installation file will have the following naming format:

install_cocodemo3tierXX_XXXX.class

This is a fully functional copy of the software with a 30 day evaluation license. When license expires, the software will not function unless a commercial license is obtained and installed. In the directory containing the installation file, enter the following command:

java install_cocodemo3tier31_0516

The last four digits correspond to the software release date and may be different, than listed, for the latest release. If java.exe is not in the system PATH, an error will occur. If the environment is configured properly, the installer displays the initial CocoBase Intallation "Welcome" dialog.

The default settings should be selected during the installation. Fill in the user information fields completely to ensure the proper installation of the software. If the software will be used for commercial purposes, be sure to obtain a commercial license.

V. Configuring CocoBase Enterprise O/R for the Database

In this example, the database used is Oracle. Therefore, a specific User/Schema name must be specified in the Oracle.properties text file to view the details of that User/Schema in CocoAdmin (GUI interface for CocoBase). Locate and open the Oracle.properties file in the thought\cocodemo3tier31\demos\ resources directory. Change the SCHEMANAME entry from SCOTT to CITYINFO.

Edit the CocoAdmin.properties text file, in the same directory, to permanently change the login entries for CocoAdmin. Locate the Oracle Thin entries and make the following changes:

Change the COCOUSERID to CITYINFO
    Change the COCOPASSWORD to CITYINFO.
    Change the Oracle_Thin_COCODBURL entry to the name of the database host server (e.g. jdbc:oracle:thin:@localhost:1521:ORCL).

VI. Configuring the TomCat Server

The following steps describe how to configure the runtime classpath and an Oracle data source for the TomCat Server.

Setting up the Server Classpath

CocoBase runtime classes plus Oracle jdbc driver classes need to be included in the jvm process that runs TomCat. In order to do that, it is necessary to modify the script that launches TomCat as follows:

1. Open the script file %CATALINA_HOME%/bin/catalina.bat (Windows) or %CATALINA_HOME%/bin/catalina.sh (Unix) in your favorite text editor
2. Look for the "setup classpath" section and edit the settings of the environment variable CP to include cocobase runtime classes and resources and oracle jdbc driver classes as exemplified below:
    SET CP=%CP%; %COCO_HOME%\classes; %COCO_HOME%\demos; %ORA_HOME%\jdbc\lib\classes12.zip Another alternative is to copy %COCO_HOME%\demos\CocoDeploy.jar (to generate it, use the script %COCO_HOME%/demos/mkcocodirs) and other required Java archives (e.g. oracle jdbc driver classes) to %CATALINA_HOME%/common/lib, but note that these files need to terminate with .jar (.zip files need to be renamed to jar).

Creating a DataSource for the Cityinfo Application

An Oracle jndi datasource properly configured is required for the TomCat server. All datasource configuration is stored in the file %CATALINA_HOME%/conf/server.xml. The following steps describe how to add a datasource entry to this configuration file.

1. Open the configuration file %CATALINA_HOME%/conf/server.xml in your favorite text editor
2. Edit the <Host> section by adding a <DefaultContext> entry like the following:

```
...
<Host...>
...
    <DefaultContext>
        <Resource name="jdbc/MyObjDataSource" auth="Container"
              type="javax.sql.DataSource"/>
        <ResourceParams name="jdbc/MyObjDataSource">
           <parameter><name>user</name><value>cityinfo</value>
           </parameter>
           <parameter><name>password</name><value>cityinfo</value>
           </parameter>
           <parameter><name>driverClassName</name>
              <value>oracle.jdbc.driver.OracleDriver</value></parameter>
           <parameter><name>driverName</name>
              <value>jdbc:oracle:thin:@localhost:1521:ORCL</value>
           </parameter>
        </ResourceParams>
    </DefaultContext>
</Host>
...
```

3. If the server is already running, make sure it is restarted.

VII. Generating the TomCat Application Object Code with CocoBase Enterprise O/R Standard code generation with CocoAdmin of CocoBase Enterprise O/R is utilized to produce the JSP for TomCat, which procedures are generally known in the art as described in prior publications by Thought, Inc regarding CocoBase Enterprise O/R. However, at the Code Generation Template pull-down menu of CocoAdmin the user need to select JSP for Entity Bean from the pull-down Java Code generation menu list. The other general procedures of CocoAdmin are followed to produce the generic web application (WAR file).

VIII. Deploying the Generated Web Application (WAR file) in TomCat

1. Copy the generated war file to %CATALINA_HOME%/webapps
2. Start the TomCat server by opening a command prompt and running the script %CATALINA_HOME%\bin\startup. This will expand the .war file under the %CATALINA_HOME%\webapps directory.

Notes:

At startup, check if the CLASSPATH entry includes all CocoBase and Oracle jdbc driver classes to make sure the startup script was properly edited.

To redeploy the war file, make sure you delete the old war file along with the whole expanded directory structure under the %CATALINA_HOME%\webapps before copying the new war file; then, restart the server.

IX. Viewing the Deployed Generated Web Application (Cityinfo JSP)

The user is now ready to connect to the Cityinfo JSP. Be sure that the TomCat Server has been started. Open a web browser and enter the following URL:

http://localhost:8080/Cityinfo/Cityinfo

A webpage is displayed with a title of "CityInfo Generated Default JSP", or the like. The web page contains entry fields of "Name" (* indicates that this is a primary key field), "Country" and "Population" and allows the actions of "Insert", "Update", "Delete" and "Find" for such entries.

Any entries made, updated or deleted in this JSP are automatically persisted to the relational data source by Coco-Base.

The three primary source code listing for the above application are set forth below.

Displayable Presentation Page (Cityinfo JSP) Example Written in HTML Format With Embedded Java Code This Cityinfo JSP is an example of a displayable presentation page that has embedded within the presentation page mark-up language some necessary object programming language logic. CocoAdmin automatically generates the HTML and embedded Java code of this JSP (displayable presentation page) along with the Java Code for a First Java Object (JSP Processor Object), and a Second Java Object (Business Object) from an object to relational schema map corresponding to a relational data source in the above example. However, these same object code listings could have been hard coded by hand by a competent programmer and/or produced from information taken from another source such a UML/XMI object model, directly from a relational data source, or from the database schema for a data source.

The presentation mark-up language (in this example HTML) provides a WEB page (presentation page) to display the names of three attributes of a Cityinfo Object "Name", "Country", and "Population" (may be referred to as fields in a corresponding data source) with 4 possible actions "Insert", "Update", "Delete" and "Find" and a button labeled "Submit" for executing one of the four possible commands (actions). The embedded Java code in this Cityinfo JSP example communicates directly with the First Java Object (the object is a Java Bean in this example, which may be referred to as a JSP Processor Class) and also references the name of the Java Bean (JSP Processor Class) having the logic for carrying out or delegating the "insert/create", "update", "delete", "select/find" and "submit" commands of the JSP and logic for tracking the values and properties of the three named attributes/fields in this example.

```
<html>
<jsp:useBean id="CityinfoProcessor" scope="session"
class="Cityinfo.CityinfoJspProcessor" />
<jsp:setProperty name="CityinfoProcessor" property="*" />
<>
<>
<html>
<head>
```

-continued

```
<title>Cityinfo JSP</title>
</head>
<body background="back.gif">
<font size = 5 color="#CC0000">
<h1><b><center>Cityinfo JSP Example</center></b></h1>
<hr>
<br>
<form method=POST action=Cityinfo.jsp>
<BR>
Enter Values to lookup a specific Object.
<BR>
<br>Name <INPUT type=text name="name" size="8"
value="<jsp:getProperty
name="CityinfoProcessor" property="name" />" >
<br><br>Country <INPUT
type=text name="country" size="8" value="<jsp:getProperty
name="CityinfoProcessor" property="country" />" ><br><br>Population
<INPUT type=text name="population" size="8" value="<jsp:getProperty
name="CityinfoProcessor" property="population" />" ><br><br>
<h2><b>Action :</b></h2>
<INPUT type="radio" name="action" value="create">Insert
<INPUT type="radio" name="action" value="update">Update
<INPUT type="radio" name="action" value="delete">Delete
<INPUT type="radio" name="action" value="select">Find
<br>
<INPUT type=submit name="submit" value="Submit">
</form>
</FONT>
</body>
</html>
<hr>
<h3><b>Status :</b></h3> <>
</html>
```

Cityinfo First Object Java Code Example

This CityinfoJspProcessor Object is a First Java Object (in this case a Java Bean) that CocoAdmin generates along with the JSP (displayable presentation page) and the Second Java Object. CocoAdmin generates this JSP Processor Java code and compiled Java Class from an object to relational schema map corresponding to a relational data source, however these same object code listings could have been hard coded by hand and/or produced from another information source UML/XMI or directly from the database schema. Further, the Java Code of the First and Second Objects could have been consolidated into a single object, but this would have violated the specification for Java and JSPs and also reduced the programming flexibility of the system. By placing the more complex logic in the business object (second object) and keeping it separate from the JSP Processor Object (first object), the JSP and first object can be utilized by multiple applications.

This First Java Object is a Java Bean that references and represents the attributes of its corresponding JSP (displayable presentation page) and includes programming logic to execute the commands (or to delegate the execution of such commands) of the JSP, as described above. Since using standard JSP standards and Java Procedures would only permit the handling of a limited number of data types, this First Java Object references the Second Java Object (Cityinfo Object) which also reflects the data and data types (attributes of the First Java Object) but includes more business logic to convert forward/reverse data types at the discretion of the programmer by merely editing the business logic. An example of the programming code for the First Java Object is set forth below:

```
package Cityinfo;
import java.sql.*;
import java.io.*;
import javax.naming.Context;
import javax.naming.InitialContext;
import javax.transaction.UserTransaction;
import java.util.*;
import java.math.*;
/**
* EJB Jsp Processor Class Generated by CocoAdmin from THOUGHT
Inc.
*
* Copyright (c) 1995–2000 THOUGHT Inc. All Rights Reserved.
**/
public class CityinfoJspProcessor implements java.io.Serializable
{
private String action = null;
private CityinfoHome cityinfoHome;
private UserTransaction utx = null;
public CityinfoJspProcessor( ) {
    try {
        Properties env = System.getProperties( );
        Context ic = new InitialContext(env);
        try {
            utx = (UserTransaction)
ic.lookup("javax.transaction.UserTransaction");
        } catch (Exception e) {
        System.err.println ("Couldn't Create User Transaction!!!");
        e.printStackTrace( );
        }
        cityinfoHome = (CityinfoHome) ic.lookup("CityinfoApp");
    } catch (Exception re) {
        System.err.println ("Couldn't locate Cityinfo Home");
        re.printStackTrace( );
    }
    reset( );
}
public String getAction( ) {
    return action;
}
public void setAction(String a) {
System.out.println("Setting action : " + a);
    action = a;
}
/**
 * Get the attribute name value.
 * @return name Returns the database attribute value is current set
to.
 **/
public String getName( )
{
    return name;
}
/**
 * Get the attribute country value.
 * @return country Returns the database attribute value is current
set to.
 **/
public String getCountry( )
{
    return country;
}
/**
 * Get the attribute population value.
 * @return population Returns the database attribute value is
current set to.
 **/
public Integer getPopulation( )
{
    return population;
}
/**
 * Set the attribute name value.
 * @param n_name the database attribute value to set the variable
to.
 **/
public void setName(String n_name)
{
    name = n_name;
}
/**
 * Set the attribute country value.
 * @param n_country the database attribute value to set the variable
to.
 **/
public void setCountry(String n_country)
{
    country = n_country;
}
/**
 * Set the attribute population value.
 * @param n_population the database attribute value to set the
variable to.
 **/
public void setPopulation(Integer n_population)
{
    population = n_population;
}
private String name = null;
private String country = null;
private Integer population = null;
/**
 * Check to see if values are equal - this should be based on key
fields.
 *
 * @param n_population the primary key instance to compare to.
 **/
public boolean equals(Object t_CityinfoJspProcessor)
{
    if (! (t_CityinfoJspProcessor instanceof
CityinfoJspProcessor))
    {
        return false;
    }
    CityinfoJspProcessor t_CompareCityinfoJspProcessor =
(CityinfoJspProcessor)t_CityinfoJspProcessor;
    if(t_CompareCityinfoJspProcessor.name == null)
    {
        if(name != null)
        {
            return false;
        }
    }
    else if(!t_CompareCityinfoJspProcessor.name.equals(name))
    {
        return false;
    }
    return true;
}
private void reset( ) {
final String emptyString = "";
final Integer zeroInteger = new Integer(0);
final BigDecimal zeroBigDecimal = new BigDecimal(0);
final Short zeroShort = new Short((short)0);
final Long zeroLong = new Long((long)0);
final Timestamp zeroTimestamp = new Timestamp((long)0);
final Time zeroTime = new Time((long)0);
final Float zeroFloat = new Float((float)0);
final Double zeroDouble = new Double((double)0);
final byte emptyByte[] = new byte[0];
final java.sql.Date zeroDate = new java.sql.Date((long)0);
setName(emptyString);
setCountry(emptyString);
setPopulation(zeroInteger);
}
public String toString( ) {
StringBuffer output = new StringBuffer( );
    output.append(" name="+getName( ));
    output.append(" country="+getCountry( ));
    output.append(" population="+getPopulation( ));
return output.toString( );
}
//
// Perform the action requested by user. Return status.
//
```

-continued

```
public String processRequest( ) {
    CityinfoInterface cityinfo = null;
    String message = "";
    System.out.println("Process request called ");
    System.out.println(this);
    try {
        if( action.equals("create") ) {
            CityinfoPK cityinfopk = new CityinfoPK( );
            try {
                utx.begin( );
                cityinfopk.name = getName( );
                cityinfo = cityinfoHome.findByPrimaryKey( cityinfopk );
                setCountry( cityinfo.getCountry( ) );
                setPopulation( cityinfo.getPopulation( ) );
                if(cityinfo != null) {
                    message = "Entity bean "+cityinfopk+" already exists! Duplicate Bean cannot be created!";
                    utx.commit( );
                    return message;
                }
            } catch (Throwable t) {
//t.printStackTrace( );
                //utx.rollback( );
            }
            try {
                //utx.begin( );
                cityinfoHome.create( getName( ), getCountry( ),
                    getPopulation( )
                );
                message = "Created Cityinfo '" + cityinfopk + "'";
                utx.commit( );
            } catch (Exception e) {
e.printStackTrace( );
                message = "Exception on Cityinfo Create ="+e;
            }
        }
        else if( action.equals("update") ) {
            try {
                utx.begin( );
                CityinfoPK cityinfopk = new CityinfoPK( );
                cityinfopk.name = getName( );
                cityinfo = cityinfoHome.findByPrimaryKey( cityinfopk );
                setCountry( cityinfo.getCountry( ) );
                setPopulation( cityinfo.getPopulation( ) );
                message = "Set Cityinfo " + this ;
                utx.commit( );
            } catch (Exception e) {
                message = "Exception on Cityinfo Update="+e;
            }
        }
        else if( action.equals("select") ) {
            try {
                CityinfoPK cityinfopk = new CityinfoPK( );
                cityinfopk.name = getName( );
                cityinfo = cityinfoHome.findByPrimaryKey( cityinfopk );
                setCountry( cityinfo.getCountry( ) );
                setPopulation( cityinfo.getPopulation( ) );
                message = "Found Cityinfo " + this;
            } catch (Exception e) {
                message = "Exception on Cityinfo Select="+e;
            }
        }
        else if( action.equals("delete") ) {
            try {
                utx.begin( );
                CityinfoPK cityinfopk = new CityinfoPK( );
                cityinfopk.name = getName( );
                cityinfo = cityinfoHome.findByPrimaryKey( cityinfopk );
                cityinfo.remove( );
                message = "Removed cityinfo " + cityinfopk;
                cityinfo = null;
                utx.commit( );
            } catch (Exception e) {
                message = "Exception on Cityinfo Delete="+e;
            }
        }
```

-continued

```
        if( cityinfo != null ) {
        }
        else {
            reset( );
        }
    }
    catch (Throwable e) {
        message = e.toString( );
    }
    return message;
}
}
```

Cityinfo Second Object Java Code Example

This Cityinfo Object is a Second Java Object that CocoAdmin generates along with the JSP (displayable presentation page) and the First Java Object. CocoAdmin generates the HTML with inbedded object code (JSP), a First Java Object (JSP Processor Object), and this Second Java Object (Business Object) from an object to relational schema map corresponding to a relational data source, however these same object code listings could have been hard coded by hand and/or produced from another information source UML/XMI or directly from the database schema. Further, the Java Code of the First and Second Objects could have been consolidated into a single object, but this would have violated the specification for Java and JSPs and also reduced the programming flexibility of the system. By placing the more complex logic in the business object (second object) and keeping it separate from the JSP Processor Object (first object), the JSP and first object can be utilized by multiple applications.

This Second Java Object (Java object in this case) is a separate business object that sits in the programming logic flow chart between the First Java Object (JSP Processor Class) and the persistence library or persistence API. This Second Java Object reflects the data of the first Java Object (JSP Processor Class) and allows for further processing to create additional data types from the reflected data types and to translate backwards to the more limited reflected data types that are displayed by the JSP. This provides more complete support for all Java Data Types that might need to be properly retrieved from a data source and persisted back to that or another data source (the Java JSP Processor specification as established by SUN Microsystems, Inc. only supports a small, more limited subset of Java data types). This Second Java Object processes commands passed to it by the JSP via the First Java Object and automatically translates and reverse translates the data types passing through it to the appropriate data types for displaying or persisting. This further processing allows more complex data types and business logic to be communicated with the persistence library or persistence API than would be possible if the JSP Processor Class communicated directly with the persistence library or API (unless the JSP specification is violated by editing the JSP Processor Class source code (First Java Object Code) to include additional logic within the JSP Processor Class). An example of the Java Code for this Second Java Object, i.e., the Cityinfo Object (business object) is set forth below:

```
package Cityinfo;
import thought.CocoBase.*;
import java.math.*;
import java.sql.*;
import java.util.*;
import java.io.*;
import java.lang.*;
/*
* Generated by GenCBClass from THOUGHT Inc.
*
* Copyright (c) 1995,2000 THOUGHT Inc. All Rights Reserved.
*
*/
public class Cityinfo extends Object implements
Cloneable,java.io.Serializable,CBProp,thought.CocoBase.EJBPrimaryKey
{
    /**
     * Constructor for Cityinfo
     */
    public Cityinfo( )
    {
    }
    /**
     * Get the attribute name value.
     * @return name Returns the database attribute value is current set
to.
     */
    public String getName( )
    {
        return name;
    }
    /**
     * Get the attribute country value.
     * @return country Returns the database attribute value is current
set to.
     */
    public String getCountry( )
    {
        return country;
    }
    /**
     * Get the attribute population value.
     * @return population Returns the database attribute value is
current set to.
     */
    public Integer getPopulation( )
    {
        return population;
    }
    /**
     * Set the attribute name value.
     * @param n__name the database attribute value to set the variable
to.
     */
    public void setName(String n__name)
    {
        name= n__name;
        if(name == null) nameNullIndicator = true;
        else
            nameNullIndicator = false;
    }
    /**
     * Set our Query Condition for column name for dynamic querying.
     */
    public void modifyNameMatch(int t__match) {
        nameMatchCondition = t__match;
    }
    /**
     * Get our Query Condition for column name for dynamic querying.
     */
    public int retrieveNameMatch( ) {
        return nameMatchCondition;
    }
    /**
     * Set the attribute country value.
     * @param n__country the database attribute value to set the variable
to.
     */
    public void setCountry(String n__country)
    {
        country= n__country;
        if(country == null) countryNullIndicator = true;
        else
            countryNullIndicator = false;
    }
    /**
     * Set our Query Condition for column country for dynamic
     querying.
     */
    public void modifyCountryMatch(int t__match) {
        countryMatchCondition = t__match;
    }
    /**
     * Get our Query Condition for column country for dynamic
     querying.
     */
    public int retrieveCountryMatch( ) {
        return countryMatchCondition;
    }
    /**
     * Set the attribute population value.
     * @param n__population the database attribute value to set the
variable to.
     */
    public void setPopulation(Integer n__population)
    {
        population= n__population;
        if(population == null) populationNullIndicator = true;
        else
            populationNullIndicator = false;
    }
    /**
     * Set our Query Condition for column population for dynamic
querying.
     */
    public void modifyPopulationMatch(int t__match) {
        populationMatchCondition = t__match;
    }
    /**
     * Get our Query Condition for column population for dynamic
querying.
     */
    public int retrievePopulationMatch( ) {
        return populationMatchCondition;
    }
    /**
     * Implement clone so update method works correctly
     */
    public Object clone( )
    {
        Cityinfo retObject = new Cityinfo( );
        retObject.setName(name);
        retObject.setCountry(country);
        retObject.setPopulation(getPopulation( ));
        return retObject;
    }
    /**
     * Implement toString( ) to properly print contents
     */
    public String toString( )
    {
        String strout =
        " name="+name+
        " country="+country+
        " population="+population+
        "\n";
        return strout;
    }
    /**
     * Take Properties result set received from database, and populate
     * Object's Data fields.
     * @param resultSet The data used in populating the Object's Data
fields
     */
    public void setPropObjectData(Properties resultSet)
    {
        if(resultSet.get("NAME") != null && !(resultSet.get("NAME")
instanceof CBNull))
```

```
            name = (String)resultSet.get("NAME");
        else {
            name = null;
            nameNullIndicator = true;
        }
        if(resultSet.get("COUNTRY") != null &&
!(resultSet.get("COUNTRY") instanceof CBNull))
            country = (String) resultSet.get("COUNTRY");
        else {
            country = null;
            countryNullIndicator = true;
        }
        if(resultSet.get("POPULATION") != null &&
!(resultSet.get("POPULATION") instanceof CBNull))
            population = ((Integer)resultSet.get("POPULATION"));
        else {
            population = null;
            populationNullIndicator = true;
        }
    }
    /**
     * Take the data in the Object's Data fields, and create a
CBQueryInfo
     * instance, which can be used by CocoBase. Since fields are
identified
     * by a key value defined by their name, field order is irrelevant
with
     * this interface.
     * @return CBQueryInfo the Object's Data fields and query info
     * @see CBQueryInfo
     */
    public CBQueryInfo getPropObjectData( )
    {
        cqi = new CBQueryInfo( );
        setProps = new Properties( );
        if(name != null) {
            // Use the CBFieldInfo to specify the match condition
            if(nameMatchCondition != -1) {
                CBFieldInfo cbfi = new CBFieldInfo( );
                cbfi.setSearchValue(name);
                cbfi.setSearchCriteria(nameMatchCondition);
                setProps.put("NAME" ,cbfi);
            } else
                setProps.put("NAME",name);
        }
        else if(nameNullIndicator) {
            // Use the CBFieldInfo to specify the match condition
            if(nameMatchCondition != -1) {
                CBFieldInfo cbfi = new CBFieldInfo( );
                cbfi.setSearchValue(name);
                cbfi.setSearchCriteria(nameMatchCondition);
                setProps.put("NAME",new CBNull( ));
            } else
                setProps.put("NAME",new CBNull( ));
        }
        if(country != null) {
            // Use the CBFieldInfo to specify the match condition
            if(countryMatchCondition != -1) {
                CBFieldInfo cbfi = new CBFieldInfo( );
                cbfi.setSearchValue(country);
                cbfi.setSearchCriteria(countryMatchCondition);
                setProps.put("COUNTRY",cbfi);
            } else
                setProps.put("COUNTRY",country);
        }
        else if(countryNullIndicator) {
            // Use the CBFieldInfo to specify the match condition
            if(countryMatchCondition != -1) {
                CBFieldInfo cbfi = new CBFieldInfo( );
                cbfi.setSearchValue(country);
                cbfi.setSearchCriteria(countryMatchCondition);
                setProps.put("COUNTRY",new CBNull( ));
            } else
                setProps.put("COUNTRY",new CBNull( ));
        }
        if(population != null) {
            // Use the CBFieldInfo to specify the match condition
            if(populationMatchCondition != -1) {
                CBFieldInfo cbfi = new CBFieldInfo( );
                cbfi.setSearchValue(population);
                cbfi.setSearchCriteria(populationMatchCondition);
                setProps.put("POPULATION",cbfi);
            } else
                setProps.put("POPULATION",population);
        }
        else if(populationNullIndicator) {
            // Use the CBFieldInfo to specify the match condition
            if(populationMatchCondition != -1) {
                CBFieldInfo cbfi = new CBFieldInfo( );
                cbfi.setSearchValue(population);
                cbfi.setSearchCriteria(populationMatchCondition);
                setProps.put("POPULATION",new CBNull( ));
            } else
                setProps.put("POPULATION",new CBNull( ));
        }
        if(cbsqlwhere != null)
            setProps.put("CBSQLWHERE", cbsqlwhere);
        cqi.setFieldValues(setProps);
        return cqi;
    }
    // Instance Variables.
    protected String name = null;
    protected boolean nameNullIndicator = false;
    protected int nameMatchCondition = -1;
    protected String country = null;
    protected boolean countryNullIndicator = false;
    protected int countryMatchCondition = -1;
    protected Integer population = null;
    protected boolean populationNullIndicator = false;
    protected int populationMatchCondition = -1;
    String cbsqlwhere = null;
    CBQueryInfo cqi = new CBQueryInfo( ); // CBProp custom query structure
    public Properties setProps = new Properties( ); // CBProp properties, global for convenience!
    /**
     * Check to see if values are equal - this should be based on key fields.
     * @param n__population the State object to compare to.
     */
    public boolean equals(Object t_Cityinfo)
    {
        if(! (t_Cityinfo instanceof Cityinfo)) return false;
        Cityinfo t_CompareCityinfo = (Cityinfo)t_Cityinfo;
        if(t_CompareCityinfo.getName( ) == null) {
            if(name != null) return false;
        }
        else
            if(!t_CompareCityinfo.getName( ).equals(name))
                return false;
        return true;
    }
    /**
     * Get the CbSQL special Query By example value.
     * @return population Returns the qbe attribute value is current set to.
     */ public String getCbsqlwhere( )
    {
        return cbsqlwhere;
    }
    /**
     * set the CbSQL special Query By example value.
     * @param population sets the qbe attribute value is current set to.
     */ public void setCbsqlwhere(String n__cbsqlwhere)
    {
        cbsqlwhere= n__cbsqlwhere;
    }
}
```

Transparent Persistence with CocoBase

CocoBase accomplishes transparent persistence with java object models without using bytecode manipulation, proprietary interfaces or class hierarchy intrusion. This means that no special classes or interfaces are needed in the Object Model in order to do persistence with CocoBase. The only requirement is that they must have a default constructor with no arguments.

There are 3 basic Runtime components that are involved in the transparent persistence of objects:

- The CocoBase Runtime O/R mapping class that wrappers the JDBC driver and issues queries and does the actual persistence calls. This is a class such as thought.CocoBase.CocoPowder or thought.CocoBase.CocoPowderPlugin20 (for jdbc 2.0 connections).
- The thought.CocoBase.Transaction object that can track changes of instances, and acts as a change 'buffer'. If a Transaction object is used, then it only calls a CocoBase Runtime driver—O/R mapping runtime class—when the txn.commit( ) is called.
- The thought.CocoBase.navapi.Navigator object that can track and detect changes in relationships based on Link definitions. Note that unlike CocoBase Maps, Link models are not kept in the CocoBase repository. Once a link definition model is created it is saved in the demos/resources directory (by default—although this can be overridden). As long as the model is in the classpath either directly or in a subdirectory called 'resources' it will find the model properties file and retrieve the navigation information.

The Navigator class can function in conjunction with a Transaction object or it can function standalone. While complex object graphs can be transparently managed directly by the Navigator and without the Transaction object, the use of the Transaction object is generally preferred because of its buffering and update optimizations which only persist those attributes that have changed.

Creating Applications with CocoBase Transparent Persistence

After classes have been generated and compiled, such as with the above application, CocoBase runtime classes can be used to persist instances of these classes. As shown in numerous other documents in the art, the CocoBase Navigator can easily develop a navigation model for the application. This model can then be used to persist the objects.

The Example below is not directed to persistence of the Navigation model for the above Cityinfo application, but the concepts can be easily applied to the Cityinfo application to provide transparent persistence.

First, open a CocoBase connection as follows:

```
CocoDriverInterface myBase = CocaDriver.getCocoDriver(
    "thought.CocoBase.CocoPowder",
    "org.hsql.jdbcDriver",
    "jdbc:HypersonicSQL:hsql://localhost;
    cocoprop=cocofactory=CocoProxyFactory",
    "sa", ""
)
if(myBase.connect( ) == -1) {
    System.out.println("Failed connect!");
    System.exit(1);
}
...
```

Now create a CocoBase transaction object to manage any objects that are retrieved. Notice how the transaction object is configured through parameters and property settings.

```
thought.CocoBase.Transaction cocoTxn =
    new thought.CocoBase.Transaction(myBase, false);
Properties cocoTransProps = new Properties( );
cocoTransProps.put("preserveCommit","true");
cocoTransProps.put("commitconnection","true");
cocoTransProps.put("throwExceptions","true");
cocoTransProps.put("updateOnlyChangedColumns","true");
cocoTxn.setProperties(cocoTransProps);
// Begin a new transaction.
cocoTxn.begin( );
...
```

Then open a CocoBase Navigator object with the Navigation model to be used and also we register the Transaction object with the Navigation model:

```
// Instantiate a Navigator with the Link model created from
// the UML/XMI document
thought.CocoBase.navapi.Navigator navigator =
    new thought.CocoBase.navapi.Navigator (myBase, "company");
// Assign the current transaction to the Navigator
navigator.setTransaction(cocoTxn);
```

Now select the top level node to work with. Notice our use of a CocoProxyM class which 'wrappers' the pure java object model class and gives the class the compatibility with CocoBase through java reflection instead of requiring any special interfaces in the java class itself:

```
// Setup our object to query
Department dept = new Department( );
department.setName("SALES");
// This will read & bind all 'Department' objects to the transaction.
Vector deptVector = myBase.selectAll(
            new thought.CocoBase.CocoProxyM(dept), "Department");
```

The CocoProxyM is optional, the code example below shows the same call without its usage.

```
// This will read & bind all 'Department' objects to the transaction.
Vector deptVector = myBase.selectAll(dept, "Department");
```

Now it is possible to step through each of these objects and tell the retrieved object to be navigated through the loadAllLinks method which does the automatic navigation for that object:

```
for(int i=0; i< deptVector.size( ); i++) {
    Department d = (Department)deptVector.elementAt(i);
    // Because the cascadeLoad flag is set to true in the direction
    // Department->Employees, the employees link will load
    automatically
    d = navigator.loadAllLinks(d,"Department");
    ...
    Vector emps = d.getEmployees( );
    for (int j=0; j<emps.size( ); j++) {
        // raise salaries by 20%
        emp.setSalary(emp.getSalary( )*1.2);
        ...
    }
```

```
. . .
// Once changes are made to an object graph those changes can be
// synchronized using the updateAllLinks method such as:
navigator.updateAllLinks(d,"Department",true);
}
```

You can then commit the buffered changes with:
  cocoTxn.commit( );

These code introductions are quite small, and can be done entirely server side with Entity or Session beans in J2EE environments with no model or object model intrusion. And for local non-J2EE applications the application intrusion is incredibly small, requiring a single method call for each root node.

The Navigator supports one-to-one, one-to-many and many-to-many relationships with cycle detection. It also detects this locally (i.e. in the client application) or by reconciling serialized or copied objects without any kind object model or bytecode intrusion. This is truly transparent persistence that is architected and designed for the VM oriented Java language. There are also more advanced applications included in the demos/pguide/navapi subdirectory that demonstrate one-to-one, one-to-many and many-to-many relationships as well as an EJB using the Navigator system to manage a graph of java objects.

The Example below is not directed to persistence of the Navigation model for the above Cityinfo application, but the concepts can be easily applied to the Cityinfo application to provide transparent persistence.

First, open a CocoBase CBFacade Transparent Persistence connection as follows:

```
// Set up the connection class - can be Local or Remote with EJB Server
CBFacade cbf =
CBFacade.create("thought.CocoBase.CBFacadeLocal");
Properties props = new Properties( );
props.put("cocosource.name",args[0]);
props.put("cocosource.jdbcdriver",args[1]);
props.put("cocosource.url",args[2]);
props.put("cocosource.user",args[3]);
props.put("cocosource.password",args[4]);
props.put("cocosource navmodel","CompanyAppLinks");
cbf.connect(props);
. . .
```

Now select the top level node to work with. Notice our use of a CocoProxyM class which 'wrappers' the pure java object model class and gives the class the compatibility with CocoBase through java reflection instead of requiring any special interfaces in the java class itself:

```
// Setup our object to query
Department dept = new Department( );
department.setName("SALES");
// This will read & bind all 'Department' objects to the transaction.
Vector deptVector = cbf.loadAll(dept,"Department");
```

Now it is possible to step through each of these objects and tell the retrieved object to be navigated through the loadAll method which does the automatic navigation for that object:

```
for(int i=0; i< deptVector.size( ); i++) {
    Department d = (Department)deptVector.elementAt(i);
    // Because the cascadeLoad flag is set to true in the direction
    // Department->Employees, the employees link will load
    automatically
    d = cbf.loadAll(d,"Department");
    . . .
    Vector emps = d.getEmployees( );
    for (int j=0; j<emps.size( ); j++) {
        // raise salaries by 20%
        emp.setSalary(emp.getSalary( )*1.2);
        . . .
    }
    . . .
    // Once changes are made to an object graph those changes can be
    // synchronized using the save method such as:
    cbf.save(d,"Department");
}
```

You can then commit the buffered changes with:
  cbf.commit( );

These code introductions are quite small, and can be done entirely server side with Entity or Session beans in J2EE environments with no model or object model intrusion. And for local non-J2EE applications the application intrusion is incredibly small, requiring a single method call for each root node.

Both the above architecture and two implementations presented herein are uniquely suited to work in every application from the tiny local app to the enterprise J2EE and to do so with superior performance and manageability.

I claim:

1. A system for creating or maintaining transparent persistence of a member selected from the group consisting of a data object, an object graph model and a portion of an object graph model when a user of the system is creating, maintaining, accessing or navigating complex data objects as a complex data object graph model, comprising:
  a) a set of definitions for the relationships between a data source schema and objects capable of storing data for an object language application, wherein the set of definitions is stored in a repository;
  b) a set of definitions for the relationships between objects for an object language application, wherein the set of definitions is part of an object application navigation model;
  c) a list of objects, or a set of objects that are to be persisted, wherein the list of objects or set of objects is part of an object application navigation model;
  d) an object or set of objects as part of a computer implemented method that contains the computer logic capable of persisting an indicated object or set of objects;
  e) an input method to provide the computer logic of d) with data corresponding to the location of information related to a), b) and c), and
  f) at least one data source to in which persisted data may be stored.

2. A system according to claim 1, that does not require any modifications to an object model or the inclusion of any persistence byte code in the object model in order to provide persistence for all or a portion of the complex data object graph model.

3. A system according to claim 2, that provides persistence for a complex data object graph model on a distributed network environment.

4. A system according to claim 3, wherein the displayable presentation page is a JSP that is associated with a first Java object referenced within the JSP source code, which is a JSP processor class object, that is in turn associated with a second Java object referenced by the first Java Object with embedded business logic that reflects the data of the first business object and can be tailored to provide additional business logic for forward and reverse conversion of data types acceptable for the JSP into data types to be stored in a data source.

5. A system according to claim 2, that provides persistence for a complex data object graph model on a distributed network environment, further comprising a generic ejb stateful session bean.

6. A system according to claim 1, further providing a system for displaying, updating or creating the data or structure of one or more data objects, and optionally its links to other objects of an object model, by utilizing a displayable presentation page format wherein the displayable presentation page source code contains embedded object programming logic, and persisting one or more of a member selected from the group consisting of an object, the data of an object, links of an object, or an object model by having the object programming logic that is embedded in the displayable presentation page directly or indirectly communicate with at least one object having at least one computer implemented method that includes imbedded computer logic for getting, setting, resetting and loading of data, and wherein the at least one object also includes computer implemented logic for communicating directly or indirectly with a persistence manager API or persistence library to persist one or more members selected from the group consisting of an object, the data of an object, a link to another object in an object model, and an object model.

7. A system according to claim 1, for creating or maintaining transparent persistence of a member selected from the group consisting of a data object, an object graph model and a portion of an object graph model when a user of the system is creating, maintaining, accessing or navigating complex data objects as a complex data object graph model, further comprising a generic ejb stateful session bean.

8. A system according to claim 1, that does not require any modifications to an object model or the inclusion of any persistence byte code in the object model in order to provide persistence for all or a portion of the complex data object graph model, further comprising a generic ejb stateful session bean.

9. A compiled or programming language software logic object code routine or set of object code routines stored in a permanent medium or in a computer system memory for providing a computer implemented method to create or maintain transparent persistence of a member selected from the group consisting of a data object, an object graph model and a portion of an object graph model when a user of the system is creating, maintaining, accessing or navigating complex data objects as a complex data object graph model, comprising:

i) logic for a computer implemented method for creating a set of definitions for the relationships between a data source schema and objects capable of storing data for an object language application, wherein the logic for the computer implemented method is capable of causing the storage of the set of definitions in a repository;

ii) logic for a computer implemented method for creating and accessing a set of definitions for the relationships between objects for an object language application, wherein the logic for the computer implemented method is capable of causing storage of the set of definitions in a navigation model;

iii) logic for a computer implemented method providing an input means for a member selected from an object name, a list of objects, or a set of objects that are to be persisted, wherein the logic for a computer implemented method is capable of causing the storage of the input as part of a navigation model that can be accessed by ii);

iv) logic for a computer implemented method containing the logic and methods to persist an object or set of objects based upon access to (a) a set of definitions for the relationships between a data source schema and objects capable of storing data for an object language application, (b) a set of definitions for the relationships between objects for an object language application, and (c) an object name, a list of objects, or a set of objects that are to be persisted, and v) logic for a computer implemented method that includes an input method which is capable of and has a method for informing iv) of the location of information relating to iv)(a), iv)(b) and iv)(c).

10. A compiled or programming language software logic object code routine or set of object code routines stored in a permanent medium or in a computer system memory for providing a computer implemented method according to claim 9, for creating or maintaining transparent persistence of a member selected from the group consisting of a data object, an object graph model and a portion of an object graph model when a user of the system is creating, maintaining, accessing or navigating complex data objects as a complex data object graph model, comprising software code for generating, accessing, or maintaining a generic ejb stateful session bean object.

11. A compiled or programming language software logic object code routine or set of object code routines stored in a permanent medium or in a computer system memory for providing a computer implemented method according to claim 9, that does not require any modifications to an object model or the inclusion of any persistence byte code in the object model in order to provide persistence for all or a portion of the complex data object graph model, further comprising a compiled or programming language software logic object code routine or set of object code routines stored in a permanent medium or in a computer system memory for a computer implemented method of generating, accessing, or maintaining a generic ejb stateful session bean object.

12. A compiled or programming language software logic object code routine or set of object code routines stored in a permanent medium or in a computer system memory providing for a computer implemented method according to claim 9, that provides persistence for a CDOG model on a distributed network environment.

13. A compiled or programming language software logic object code routine or set of object code routines stored in a permanent medium or in a computer system memory providing for a computer implemented method according to claim 9, that includes a compiled or programming language software logic object code routine or set of object code routines stored in a permanent medium or in a computer system memory for a computer implemented method to automatically generate the logic for at least one of the routines from a relational data source schema, or to generate the logic from an object to relational mapping resource, said compiled or programming language software logic object code routine or set of object code routines that are stored in a permanent medium or in a computer system memory for a computer implemented method comprising:

a). at least one presentation page having embedded within its source code object language programming logic that references attributes of a data object and also references at least one associated programming object for executing commands associated with navigating the presentation page, wherein the presentation page has an ability to display the data of an object in an object model, and to optionally display information regarding at least one link of that object to another object in an object model or to provide a labeled link button for navigating to the presentation page of a linked object in an object model, or to provide both a link and a labeled link button, and b). at least one associated corresponding programming object containing programming logic for communicating with the presentation page and executing commands associated with such navigation, and further containing logic for directly or indirectly communicating with a persistence manager API, or persistence library, that as the presentation page is being navigated can persist the object, its data or links to other objects in an object model, or both its data and links to other objects in an object model, and c). optionally comprising a set of related presentation pages that can be navigated and their associated programming objects as described in (a) and (b) above, which collectively represent the linked objects of a specified object model, and d). optionally comprising an a computer implemented method with the ability to query against the object graph using a object query facility or syntax.

14. A method of claim 13, comprising a set of related presentation pages that can be navigated and their associated programming objects as described in (a) and (b), which collectively represent the linked objects of a specified object model.

15. A method according to claim 14, wherein the object query facility is a computer implemented method and associated logic that utilizes EJB-QL query syntax or similar syntax.

16. A method according to claim 13, wherein the object query facility is a computer implemented method and associated logic that utilizes EJB-QL query syntax or similar syntax.

17. A method for visually navigating an object model while dynamically creating, updating and persisting such an object model to a data source by utilizing the compiled or programming language software logic object code routine or set of object code routines stored in a permanent medium or in a computer system memory for a computer implemented method of claim 13, whereby a navigation model may be navigated in at least one direction and any changes to one or more of members selected from the group consisting of the data of an object, an object, a link between an object, or an object model can be dynamically persisted to a data source.

* * * * *

UNITED STATES PATENT AND TRADEMARK OFFICE
Certificate

Patent No. 7,103,600 B2    Patented: September 5, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ward Mullins, San Francisco, CA (US); and Alexandre Jonatan B. Martins, Florianopolis-SC (BR).

Signed and Sealed this First Day of April 2014.

VINCENT TRANS
*Supervisory Patent Examiner*
Art Unit 2165
Technology Center 2100